United States Patent
Imoto et al.

(10) Patent No.: US 11,481,943 B2
(45) Date of Patent: Oct. 25, 2022

(54) INFORMATION PROCESSING APPARATUS, INFORMATION PROCESSING METHOD, AND PROGRAM

(71) Applicant: SONY CORPORATION, Tokyo (JP)

(72) Inventors: Maki Imoto, Tokyo (JP); Tomoya Narita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/156,988

(22) Filed: Jan. 25, 2021

(65) Prior Publication Data

US 2021/0142543 A1    May 13, 2021

Related U.S. Application Data

(63) Continuation of application No. 16/662,788, filed on Oct. 24, 2019, now Pat. No. 10,922,865, which is a
(Continued)

(30) Foreign Application Priority Data

Jul. 21, 2015 (JP) .............................. JP2015-143711

(51) Int. Cl.
*G06T 11/60* (2006.01)
*G06T 3/00* (2006.01)
(Continued)

(52) U.S. Cl.
CPC ............ *G06T 11/60* (2013.01); *G06F 3/0486* (2013.01); *G06T 1/00* (2013.01); *G06T 3/00* (2013.01);
(Continued)

(58) Field of Classification Search
None
See application file for complete search history.

(56) References Cited

U.S. PATENT DOCUMENTS

| 9,224,248 | B2 | 12/2015 | Ye et al. |
| 9,245,176 | B2 | 1/2016 | Matthews et al. |

(Continued)

FOREIGN PATENT DOCUMENTS

| JP | H10-126687 A | 5/1998 |
| JP | 2002-008057 A | 1/2002 |

OTHER PUBLICATIONS

Ma, Wan-Chun, Marco Barbati, and J. P. Lewis. "A facial composite editor for blendshape characters." Proceedings of the Digital Production Symposium. 2012.*
(Continued)

*Primary Examiner* — Ryan M Gray
(74) *Attorney, Agent, or Firm* — Paratus Law Group, PLLC

(57) ABSTRACT

There is provided an information processing apparatus, an information processing method, and a program capable of performing synthesis that is desirable for users as described above, the information processing apparatus including: a control unit configured to generate a synthesized object model by synthesizing a first object model and a second object model, and cause the generated synthesized object model to be displayed in association with an image corresponding to the first object model or the second object model. The control unit controls a mode of the synthesis on the basis of input information.

20 Claims, 26 Drawing Sheets

Related U.S. Application Data continuation of application No. 15/735,745, filed as application No. PCT/JP2016/063746 on May 9, 2016, now Pat. No. 10,460,493.

(51) Int. Cl.

| | | |
|---|---|---|
| *G06T 1/00* | (2006.01) | |
| *H04N 1/387* | (2006.01) | |
| *G06T 17/20* | (2006.01) | |
| *G06F 3/0486* | (2013.01) | |
| *G06V 40/16* | (2022.01) | |

(52) U.S. Cl.
CPC ........... *G06T 17/205* (2013.01); *H04N 1/387* (2013.01); *G06V 40/174* (2022.01)

(56) References Cited

U.S. PATENT DOCUMENTS

| | | |
|---|---|---|
| 2008/0165187 A1 | 7/2008 | Marugame |
| 2009/0202114 A1 | 8/2009 | Morin et al. |
| 2009/0225099 A1* | 9/2009 | Yuasa ................ G06T 7/344 382/154 |
| 2011/0188738 A1 | 8/2011 | Roussel |
| 2011/0298799 A1 | 12/2011 | Mariani et al. |
| 2012/0130717 A1 | 5/2012 | Xu et al. |
| 2013/0101164 A1 | 4/2013 | Leclerc et al. |
| 2014/0043329 A1 | 2/2014 | Wang et al. |
| 2015/0221136 A1 | 8/2015 | Shaburova et al. |
| 2015/0272691 A1 | 10/2015 | Kim et al. |
| 2016/0050169 A1 | 2/2016 | Ben Atar et al. |
| 2016/0127681 A1 | 5/2016 | Turbell |
| 2016/0127682 A1 | 5/2016 | Turbell |
| 2016/0148427 A1 | 5/2016 | Tena et al. |
| 2016/0191958 A1 | 6/2016 | Nauseef et al. |
| 2016/0196665 A1 | 7/2016 | Abreu et al. |
| 2017/0039752 A1 | 2/2017 | Quinn et al. |
| 2017/0278302 A1 | 9/2017 | Varanasi et al. |
| 2018/0182144 A1 | 6/2018 | Imoto et al. |
| 2020/0202579 A1 | 6/2020 | Caballero et al. |

OTHER PUBLICATIONS

Zhang, Yu, and Edmond C. Prakash. "Face to face: anthropometry-based interactive face shape modeling using model priors." International Journal of Computer Games Technology 2009 (2009).*

Apostolakis et al., "RAAT—The reverie avatar authoring tool." 2013 18th International Conference on Digital Signal Processing (DSP). IEEE, 2013, pp. 1-6.

Ma et al., "A facial composite editor for blendshape characters." Proceedings of the Digital Production Symposium. ACM, 2012, pp. 1-6.

Zhang et al., "Face to face: anthropometry-based interactive face shape modeling using model priors." International Journal of Computer Games Technology 2009 (2009): 5, pp. 1-15.

* cited by examiner

INFORMATION PROCESSING APPARATUS, INFORMATION PROCESSING METHOD, AND PROGRAM

CROSS REFERENCE TO PRIOR APPLICATION

This application is a continuation of U.S. patent application Ser. No. 16/662,788 (filed on Oct. 24, 2019), which is a continuation of U.S. patent application Ser. No. 15/735,745 (filed on Dec. 12, 2017 and issued as U.S. Pat. No. 10,460,493 on Oct. 29, 2019), which is a National Stage Patent Application of PCT International Patent Application No. PCT/JP2016/063746 (filed on May 9, 2016) under 35 U.S.C. § 371, which claims priority to Japanese Patent Application No. 2015-143711 (filed on Jul. 21, 2015), which are all hereby incorporated by reference in their entirety.

TECHNICAL FIELD

The present disclosure relates to an information processing apparatus, an information processing method, and a program.

BACKGROUND ART

In recent years, technologies of superimposing and displaying images on virtual or real images have been studied and developed with progress in image processing technologies. There is also an augmented reality (AR) technology, for example, as one of such technologies, and the technology has been applied to various fields.

For example, Patent Literature 1 discloses an information processing apparatus that superimposes and displays a make-up image, which tracks a face in an image, on the image on the basis of positions of parts of the face recognized in the image. Various images can also be superimposed and displayed instead of the make-up image. Specifically, a synthesized image obtained by synthesizing two or more images is included.

CITATION LIST

Patent Literature

Patent Literature 1: JP 2012-181688A

DISCLOSURE OF INVENTION

Technical Problem

However, the synthesis of the images in the technology in the related art is fixed and does not always suit intentions of users. Thus, the present disclosure will propose a novel and improved information processing apparatus, information processing method, and program capable of performing synthesis that is desirable for users.

Solution to Problem

According to the present disclosure, there is provided an information processing apparatus including: a control unit configured to generate a synthesized object model by synthesizing a first object model and a second object model, and cause the generated synthesized object model to be displayed in association with an image corresponding to the first object model or the second object model. The control unit controls a mode of the synthesis on the basis of input information.

In addition, according to the present disclosure, there is provided an information processing method including: by a control unit, generating a synthesized object model by synthesizing a first object model and a second object model; causing the generated synthesized object model to be displayed in association with an image corresponding to the first object model or the second object model; and controlling a mode of the synthesis on the basis of input information.

In addition, according to the present disclosure, there is provided a program that causes a computer to realize: a function of generating a synthesized object model by synthesizing a first object model and a second object model; a function of causing the generated synthesized object model to be displayed in association with an image corresponding to the first object model or the second object model; and a function of controlling a mode of the synthesis on the basis of input information.

Advantageous Effects of Invention

According to the present disclosure, it is possible to provide an information processing apparatus, an information processing method, and a program capable of performing synthesis that is desirable for users as described above. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
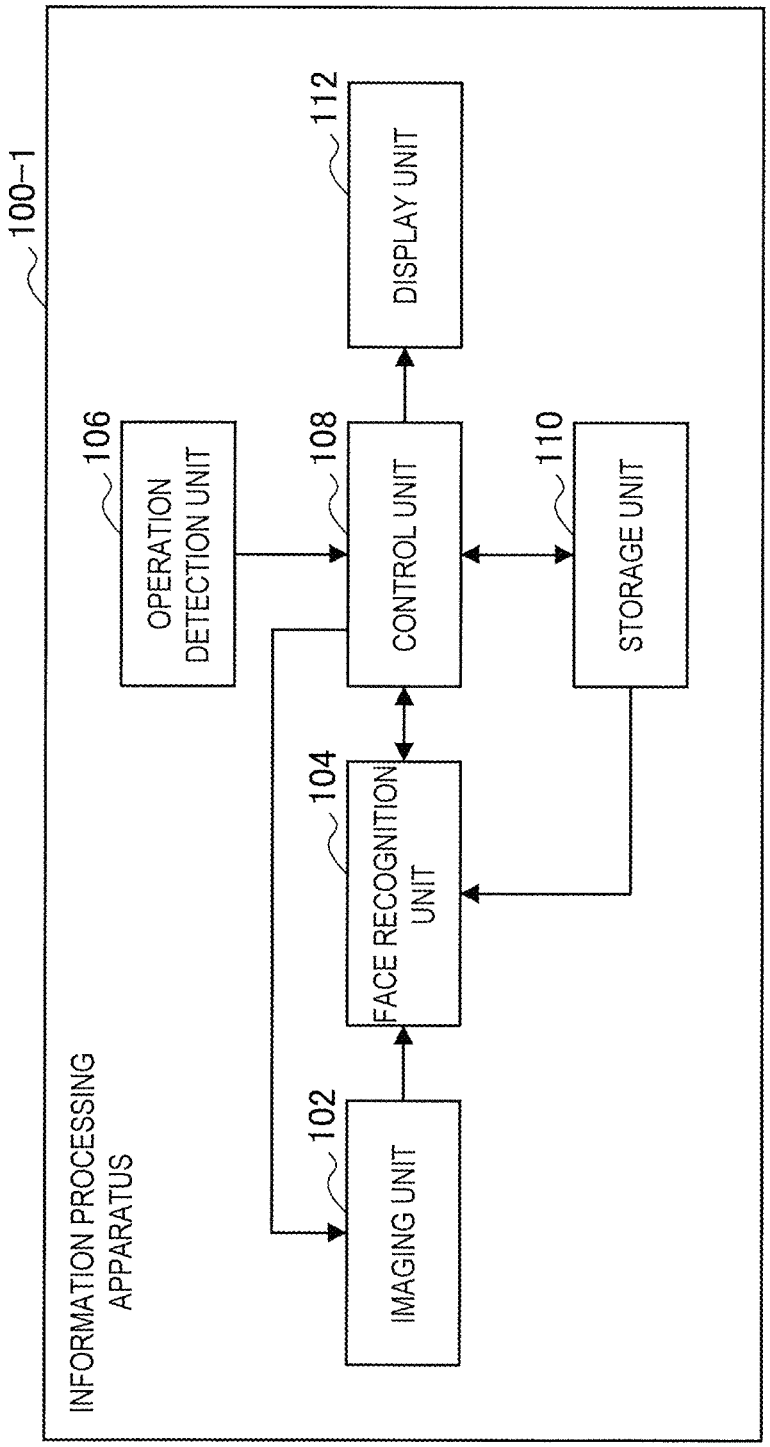
FIG. 1 is a block diagram showing a schematic functional configuration example of an information processing apparatus according to a first embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

In the specification and the drawings, a plurality of components with substantially the same functional configurations will be distinguished with different numbers added to the same reference numerals in some cases. For example, a plurality of configurations with substantially the same function will be distinguished as a face mask 20A and a face mask 20B, for example, as needed. However, only the same reference numerals will be given in a case in which it is not necessary to distinguish substantially the same functional configurations. In a case in which it is not particularly necessary to distinguish the face mask 20A and the face mask 20B, the face masks will be simply referred to as face masks 20.

Description will be given in the following order.
1. First embodiment (application example to mobile terminal)
1-1. Configuration of apparatus
1-2. Technical features of apparatus
1-3. Processing by apparatus
1-4. Summary of first embodiment
1-5. Modification examples
2. Second embodiment (application example to digital signage apparatus)
2-1. Configuration of apparatus
2-2. Technical features of apparatus
2-3. Processing by apparatus
2-4. Summary of first embodiment
2-5. Modification examples
3. Application examples
4. Hardware configuration of information processing apparatus according to one
embodiment of present disclosure
5. Conclusion

1. FIRST EMBODIMENT (APPLICATION EXAMPLE TO MOBILE TERMINAL)

First, an information processing apparatus 100-1 according to a first embodiment of the present disclosure will be described. The information processing apparatus 100-1 according to the embodiment is a portable mobile terminal such as a smartphone or a tablet terminal. Information processing apparatuses 100 according to the first and second embodiments will be distinguished by adding numbers corresponding to the embodiments at the ends, such as an information processing apparatus 100-1 and an information processing apparatus 100-2 for convenience of description.

1-1. Configuration of Apparatus

A functional configuration of the information processing apparatus 100-1 according to the first embodiment of the present disclosure will be described with reference to FIG. 1. FIG. 1 is a block diagram showing a schematic functional configuration example of the information processing apparatus 100-1 according to the first embodiment of the present disclosure.

The information processing apparatus 100-1 includes an imaging unit 102, a face recognition unit 104, an operation detection unit 106, a control unit 108, a storage unit 110, and a display unit 112 as shown in FIG. 1.

The imaging unit 102 images the surroundings of the information processing apparatus 100-1. Specifically, the imaging unit 102 captures a stationary image or a moving image on the basis of an instruction from the control unit 108. For example, the imaging unit 102 can include an imaging optical system such as an imaging lens for collecting light and a zoom lens and a signal conversion element such as a charge coupled device (CCD) and a complementary metal oxide semiconductor (CMOS). An input unit that obtains images may be included instead of the imaging unit 102. The images may be acquired via communication.

The face recognition unit 104 recognizes a face included in an image as an object (including a part of an object). Specifically, the face recognition unit 104 recognizes a face appearing in an image obtained through image capturing by the imaging unit 102 or a face included in an image that is stored in the storage unit 110. Then, a face recognition result is provided to the control unit 108. For example, the face recognition unit 104 performs face recognition processing by using a typical face recognition technology.

The operation detection unit 106 detects a user's operation performed on the information processing apparatus 100-1. Specifically, if a user performs an operation, the operation detection unit 106 acquires information related to the operation, and detects content of the operation from the acquired information related to the operation. Then, an operation detection result is provided to the control unit 108. For example, the operation detected can be a button operation, a clicking operation, a tapping operation, a dragging and dropping operation, a swiping operation, a flicking operation, a gesture operation, or the like.

Figure 2:
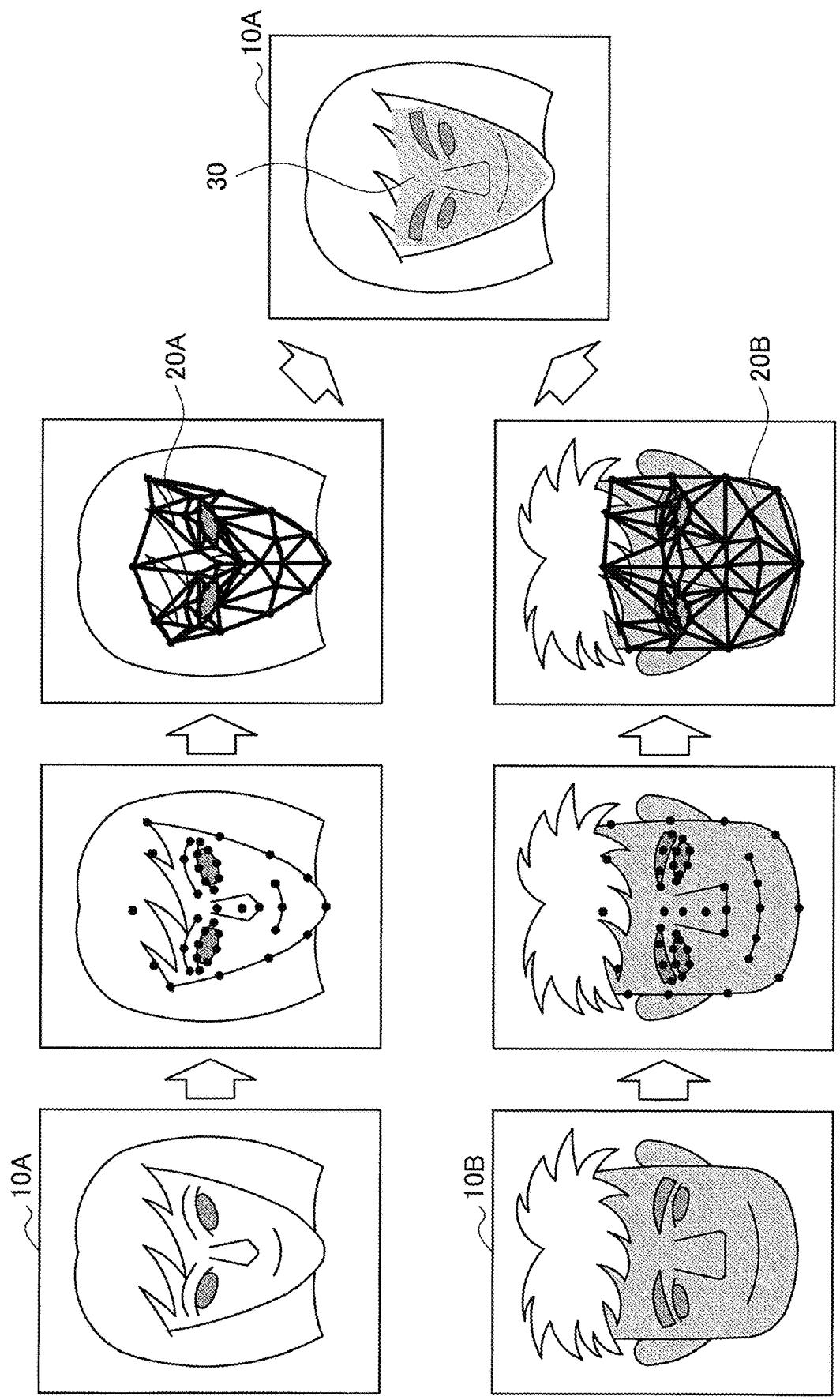
FIG. 2 is a diagram illustrating image synthesis processing according to the embodiment.

The control unit 108 controls image display. Specifically, the control unit 108 performs image synthesis processing on the basis of the face recognition result by the face recognition unit 104 and the operation detection result detected by the operation detection unit 106. Furthermore, image synthesis processing will be described in detail with reference to FIG. 2. FIG. 2 is a diagram illustrating processing of synthesizing an image according to the embodiment.

First, the control unit 108 detects feature points in the recognized face. For example, the control unit 108 detects the feature points as shown in the center left diagrams in FIG. 2 in images (hereinafter, also referred to as face images) 10A and 10B of a face recognized by the face recognition unit 104 as shown in the left diagrams in FIG. 2.

Next, the control unit 108 generates face models (hereinafter, also referred to as face masks) on the basis of the detected feature points. Specifically, the control unit 108 generates information (hereinafter, also referred to as face feature information) including mesh information and texture information on the basis of the feature points. Then, the control unit 108 generates face masks on the basis of the face feature information. For example, the control unit 108 generates the mesh information related to a mesh as shown in the center right diagrams in FIG. 2 on the basis of the feature points and generates texture information related to a texture in regions sectioned by the mesh. Then, the control unit 108 respectively generates the face masks 20A and 20B as shown in the right center diagram in FIG. 2 on the basis of the mesh information and the texture information for each of the face images 10A and 10B.

Next, the control unit 108 generates a synthesized face mask by synthesizing the face masks. Specifically, the control unit 108 combines the face feature information of the respective face masks and generates the synthesized face mask on the basis of the face feature information obtained by the combination. For example, the control unit 108 generates the face feature information including the mesh information of the face mask 20A and the texture information of the face mask 20B as shown in the right center diagram in FIG. 2 and generates the synthesized face mask on the basis of the face feature information.

Next, the control unit 108 causes the generated synthesized face mask to be displayed in association with an image corresponding to a face mask that serves as a synthesis destination or a synthesis source (hereinafter, also referred to as a target of synthesis). For example, the control unit 108 causes the generated synthesized face mask 30 to be superimposed and displayed on a face image 10A corresponding to the face mask 20A as shown in the right diagram in FIG. 2.

Returning to the description of the functional configuration of the information processing apparatus 100-1 with reference to FIG. 1, the storage unit 110 stores information related to image processing. Specifically, the storage unit 110 stores an image as an input to the face recognition processing and dictionary information (feature point information) for face recognition.

The display unit 112 displays an image. Specifically, the display unit 112 displays an image provided from the control unit 108. For example, the display unit 112 can be a liquid crystal panel, an organic electroluminescence (EL) display, or the like.

1-2. Technical Features of Apparatus

Next, technical features of the information processing apparatus 100-1 according to the embodiment will be described.

(A. Assignment of Target of Synthesis)

Figure 3:
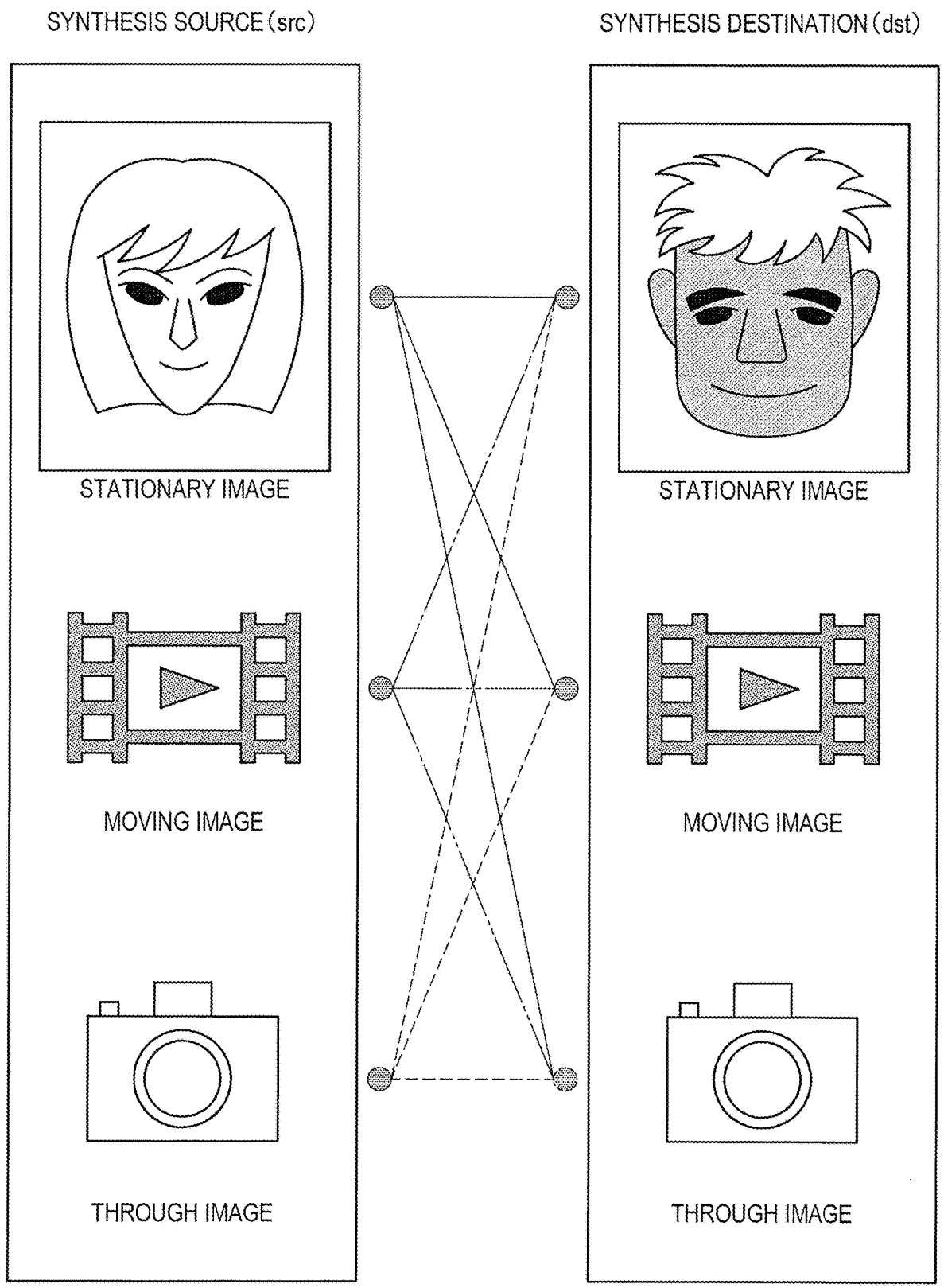
FIG. 3 is a diagram showing a combination example of src and dst according to the embodiment.

The information processing apparatus 100-1 assigns a target of synthesis in response to a user's input. Specifically, the control unit 108 assigns as a target of synthesis a face mask specified on the basis of a user's input operation or a face mask generated from a specified face image. The assignment of the target of synthesis is assignment of a synthesis source (src) and a synthesis destination (dst). Furthermore, combinations of src and dst will be described with reference to FIG. 3. FIG. 3 is a diagram showing an example of combinations of src and dst according to the embodiment.

First, there are mainly three types of face images corresponding to a face mask that serves as a target of synthesis. For example, the face image can be a stationary image, a moving image, or an image that is temporarily recorded by image capturing (hereinafter, also referred to as a through image). The control unit 108 synthesizes a face mask generated from a face image that is a stationary image, a moving image, or a through image and a face mask generated from a face image that is a stationary image, a moving image, or a through image. Therefore, nine synthesis patterns are present as shown in FIG. 3, for example. In addition, src or dst may be face masks that have already been generated, and sixteen synthesis patterns are present if this case is included.

There are some timings at which the face masks are generated. Specifically, the face masks are generated before the synthesis processing or when the synthesis processing is started. Examples of timings before the synthesis processing include time at which the face recognition unit 104 recognizes a face. Examples of the time when the synthesis processing is started include time when movement of the face masks, which will be described later, is started or time when the assignment of the target of synthesis, which is not accompanied by the movement of the face masks, is completed.

The control unit 108 causes the face mask, which is the target of synthesis to be moved in response to an input based on user's motion. Specifically, the input based on the user's motion includes an operation for assigning both a start point and an end point or an operation for assigning only a start point. There is a dragging and dropping operation as the operation for assigning both the start point and the end point. There is a swiping operation or a flicking operation as the operation of assigning only the start pint. For example, the control unit 108 assigns as sec a face mask or a face image (hereinafter, also referred to as a face mask or the like) as a target of the dragging operation and assigns as dst a face mask or the like as a target of the dropping operation. Alternatively, the control unit 108 assigns as src a face mask or the like on which the swiping operation or the flicking operation has been performed on and assigns as dst a face mask or the like that is positioned in a direction of the swiping operation or the flicking operation. The face mask or the like on which the swiping operation or the flicking operation has been performed is moved as if it flew toward the direction of the operation.

(A-1. Assignment of Synthesis Source)

Figure 4:
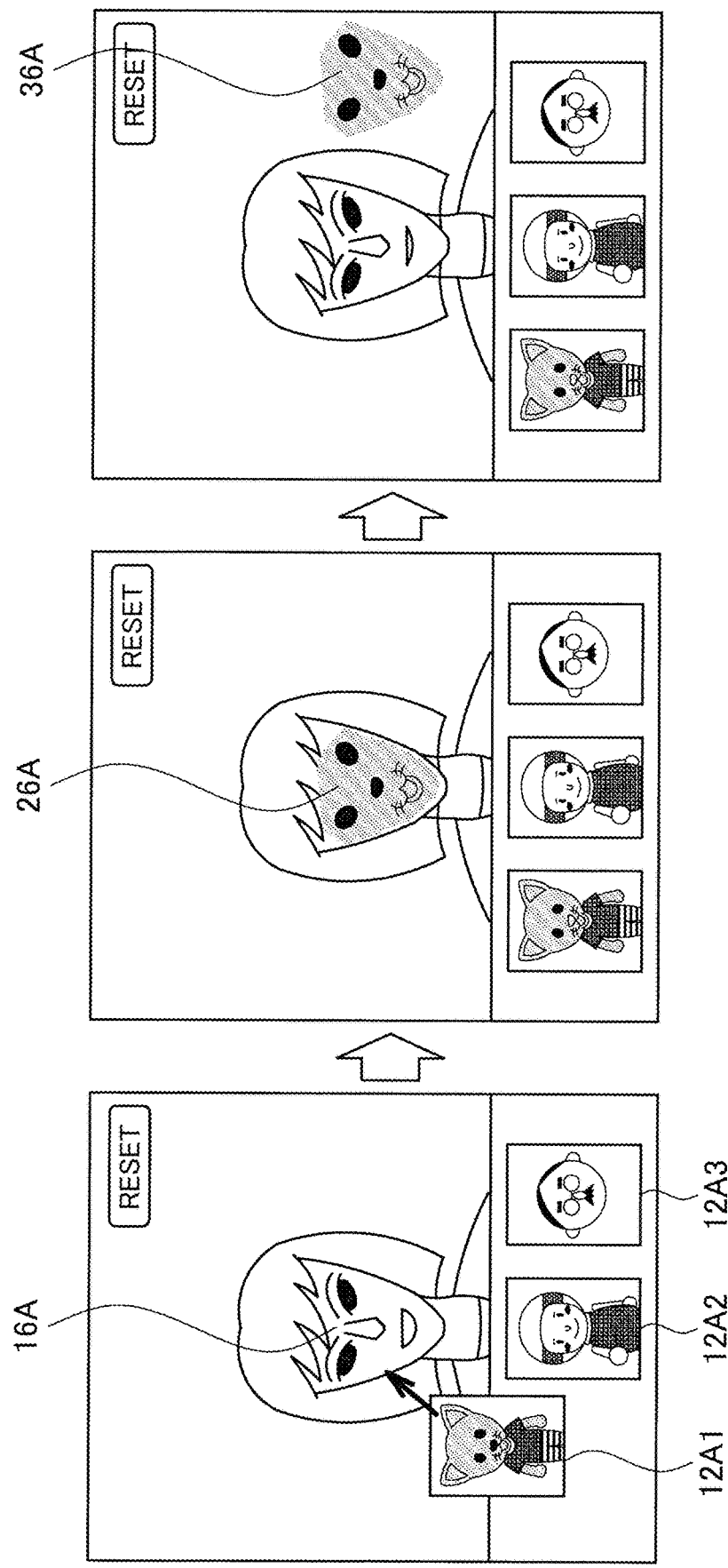
FIG. 4 is a diagram illustrating operations and processing related to a synthesized face mask according to the embodiment.

The control unit 108 assigns as src a face mask that is selected by a user's input operation or a face mask that is generated from a selected face image. Specifically, the control unit 108 causes a face list, in which face masks or face images are lined up, to be displayed on a screen. Then, the control unit 108 assigns as src a face mask that is selected from the face list by a user's input operation or a face mask that is generated from a selected face image. For example, the control unit 108 assigns as src a face mask that is selected as a target of movement. Furthermore, processing of assigning a synthesis source will be described in detail with reference to FIG. 4. FIG. 4 is a diagram illustrating operations and processing related to a synthesized face mask according to the embodiment.

The control unit 108 causes the face list, in which face masks or face images are lined up, to be displayed on the screen. For example, the control unit 108 causes a face list, in which stationary face images 12A1 to 12A3 as shown in the lower portion in FIG. 4 are lined up, to be displayed on the screen.

Then, the control unit 108 assigns as src a face mask that is specified by an user's input operation from the face list or a face mask that is generated from a specified face image. For example, the control unit 108 assigns as src the stationary face image 12A1 as a target of the dragging operation as shown in the left diagram in FIG. 4.

Although the example in which src is selected from the face list has been described hitherto, src may be selected from a stationary image, a moving image, or a through image displayed on the screen. For example, the control unit 108 assigns as src a face mask or the like that is selected by the user from a face image included in the face recognition result obtained from the stationary image, the moving image, or the through image displayed on the screen or from a face mask that is generated from the face image.

The control unit 108 selects a face mask or the like lined up in the face list on the basis of attributes of a face expressed by a face mask as a candidate of synthesis. Specifically, the attributes of the face include an age or a sex. For example, the control unit 108 selects a face mask or a face image corresponding to the face mask of a an age that is close to an age estimated from the face of the face image provided as a face recognition result from the face recognition unit 104 or that expresses a face of the same sex as an estimated sex. Then, the control unit 108 causes the face list, in which the selected face mask or the like is lined up, to be displayed.

The face mask or the like lined up in the face list may be a face mask or the like for a face recognized in a predetermined period of time.

(A-2. Assignment of Synthesis Destination)

The control unit 108 assigns as dst a face mask that is selected by a user's input operation or a face mask that is generated from a selected face image. Specifically, the control unit 108 assigns as dst a face mask or the like at a movement destination, such as a face mask or the like to be moved. Furthermore, processing of assigning the synthesis destination will be described in detail with reference to FIG. 4.

The control unit 108 causes the face mask or the like assigned as src to be moved in response to an input based on user's motion. For example, the control unit 108 causes a stationary face image 12A1 assigned as a target of a dragging operation as shown in the left diagram in FIG. 4 to be moved in accordance with user's finger motion.

Next, the control unit 108 assigns as dst a face mask or the like that is present at a position at which an input ends when the input based on user's motion ends. For example, if the stationary face image 12A1 is moved toward a through face image 16A, and a dropping operation is performed on the face image 16 as shown in the left drawing in FIG. 4, the control unit 108 assigns the face image 16A as dst.

(B. Generation of Synthesized Face Mask Based on Synthesis Mode)

The information processing apparatus 100-1 generates a synthesized face mask in accordance with a mode for synthesis (hereinafter, also referred to as a synthesis mode) on the basis of face masks or the like assigned as targets of synthesis. Specifically, the control unit 108 generates a synthesized face mask by synthesizing a face mask that has been assigned as src or has been generated from the assigned face image and a face mask that has been assigned as dst or has been generated from the assigned face image in accordance with the synthesis mode.

Here, the synthesis mode includes a first mode in which the synthesized face mask is generated on the basis of the mesh information of the face mask that is src and a second mode in which the synthesized face mask is generated on the basis of the mesh information of the face mask that is dst. The synthesized face mask is generated on the basis of the texture information of the face mask that is dst in the first mode while the synthesized face mask is generated on the basis of the texture information of the face mask that is src in the second mode.

For example, the control unit 108 synthesizes a face mask that is generated from the face image 12A1 as shown in the left diagram in FIG. 4 that has been assigned as src and a face mask that is generated from the face image 16A as shown in the left diagram in FIG. 4 that has been assigned as dst. In the example in FIG. 4, the control unit 108 generates a synthesized face mask 36A as shown in the center diagram in FIG. 4 employing the mesh information of the face mask, which is generated from the face image 16A that is dst, as mesh information and employing the texture information of the face mask, which is generated from the face image 12A1 that is src, as texture information in accordance with the second mode.

In a case in which the synthesis destination is not assigned, the control unit 108 may not perform synthesis. Specifically, if an input based on user's motion is interrupted, the control unit 108 does not synthesize the face masks. In a case in which a dropping operation is performed at a position where no face mask or face image is displayed, for example, the control unit 108 does not perform synthesis.

(C. Control of Synthesis Mode)

The information processing apparatus 100-1 controls the aforementioned synthesis mode. Specifically, the control unit 108 controls the synthesis mode on the basis of input information. More specifically, the input information includes information related to an image corresponding to a face mask that is src or a face mask that is dst corresponding to an input of processing by the control unit 108. Examples of the information related to the image include information related to attributes of the image or content of the image. As the attributes of the image, a type of medium (electronic medium) such as a stationary image, a moving image, or a through image and a type of content such as a photograph or a computer graphic (CG) are exemplified. In a case in which a face mask of a stationary image is dst, and a face mask of a moving image is src, for example, the control unit 108 selects the first mode. As the content of the image, a speech of a person who appears in the image and presence or content of actions such as music playing or sports are exemplified.

Figure 5:
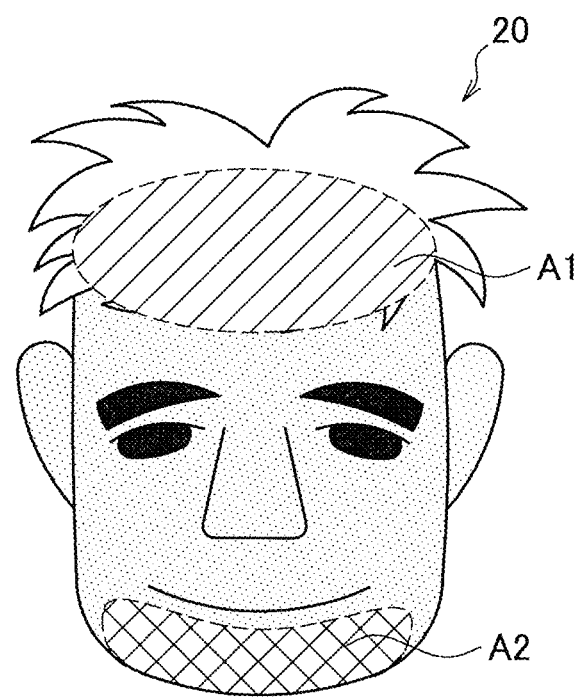
FIG. 5 is a diagram showing an example of a face mask that is displayed by the information processing apparatus according to the embodiment.

The input information may be information related to a user's input operation. Specifically, the user's input operation includes an operation of selecting a face mask that serves as src or a face mask that serves as dst, and the control unit 108 assigns the synthesis mode in accordance with a position of selecting the face mask that serves as src or the face mask that serves as dst. Furthermore, processing of assigning the synthesis mode in accordance with the position of selection will be described in detail with reference to FIG. 5. FIG. 5 is a diagram showing an example of a face mask displayed by the information processing apparatus 100-1 according to the embodiment.

The control unit 108 causes a position of selecting the face mask that serves as src or the face mask that serves as dst corresponding to each synthesis mode, to be displayed in a visually distinguishable form. Specifically, the control unit 108 causes the position of selection to be displayed in a form different from a form that is specified by texture information of the face mask displayed. For example, the control unit 108 causes a face mask 20, in which different colors are applied to the shaded region A1 and the hatched region A2 as shown in FIG. 5, to be displayed. In a case in which the user starts a dragging operation from a starting point in the region A1, for example, the first mode is assigned as the synthesis mode. In a case in which the user starts a dragging operation from a starting point in the region A2, the second mode is assigned as the synthesis mode.

Although the example in which the visually distinguishable form is use of colors has been described hitherto, the form may be use of brightness, luminance, patterns, or blinking. In a case in which a position outside the position of selection corresponding to each synthesis mode is selected, the control unit 108 does not assign the synthesis mode on the basis of the position of selection.

Although the example in which the user's input operation is an operation of selecting the face mask has been described hitherto, the user's input operation may be a clicking operation or a tapping operation on the synthesized face mask in addition to the aforementioned example. The user's input operation may be an operation performed on a dedicated graphical user interface (GUI). For example, the mode is assigned in accordance with an operation result of a synthesis mode switching button or a synthesis mode assignment menu that is displayed when a dropping operation is performed. Also, a display object indicating a synthesis mode being selected may be displayed on the screen.

(D. Display of Synthesized Face Mask)

The information processing apparatus 100-1 associates and displays a generated synthesized face mask with a face image. Specifically, the control unit 108 causes a synthesized face mask with to be displayed in association with a face image that is specified on the basis of a user's input from among face images corresponding to the face mask that is src and the face mask that is dst. More specifically, the control unit 108 causes the synthesized face mask to be displayed in association with the image corresponding to the face mask of dst after completion of movement from the face mask of src to the face mask of dst. For example, the control unit 108 causes the synthesized face mask 36A as shown in the center diagram in FIG. 4, which has been obtained by the synthesis, to be superimposed and displayed on the face image 16A that has been assigned as dst by a dropping operation. The control unit 108 may represent the texture of the synthesized face mask as being transparent and cause transparency to be reduced with elapse of time when displaying the synthesized face mask.

(E. Operations on Synthesized Face Mask)

The information processing apparatus 100-1 causes the synthesized face mask to be moved in response to a user's operation in the same manner as the face masks. Specifically, the control unit 108 causes the synthesized face mask to be moved in accordance with an input based on user's motion. For example, the control unit 108 causes the synthesized face mask 36A as shown in the right diagram in FIG. 4 to be moved in response to a dragging operation by the user. The synthesized face mask is changed in accordance with a change in src or dst even while the synthesized face mask is not superimposed and displayed on a face image.

(F. Saving of Image)

The information processing apparatus 100-1 saves the image on which the synthesized face mask is superimposed and displayed (hereinafter, also referred to as a processed image). Specifically, if an operation of saving the image is detected by the operation detection unit 106 in a state in which the synthesized face mask is displayed on the screen, the control unit 108 causes the storage unit 110 to store the processed image.

The information processing apparatus 100-1 may allow the user to select the processed image and an unprocessed image as a target of the saving. For example, if the operation of saving the image is detected by the operation detection unit 106, the control unit 108 causes a GUI to be displayed on the screen, the GUI allowing the user to select which of the processed image and the unprocessed image is to be saved. Then, the control unit 108 saves the processed image or the unprocessed image in accordance with a selection result.

The information processing apparatus 100-1 may display a display object that indicates that the image is a processed image on the screen. For example, the control unit 108 causes a marking object to be displayed at a corner of the processed image. Also, the control unit 108 may cause a display object like a finger grip at to be displayed a position adjacent to the synthesized face mask, may lower transparency of the outline of the synthesized face mask, or may cause the synthesized face mask to be displayed as if the synthesized face mask was able to be flipped.

1-3. Processing by Apparatus

Figure 6:
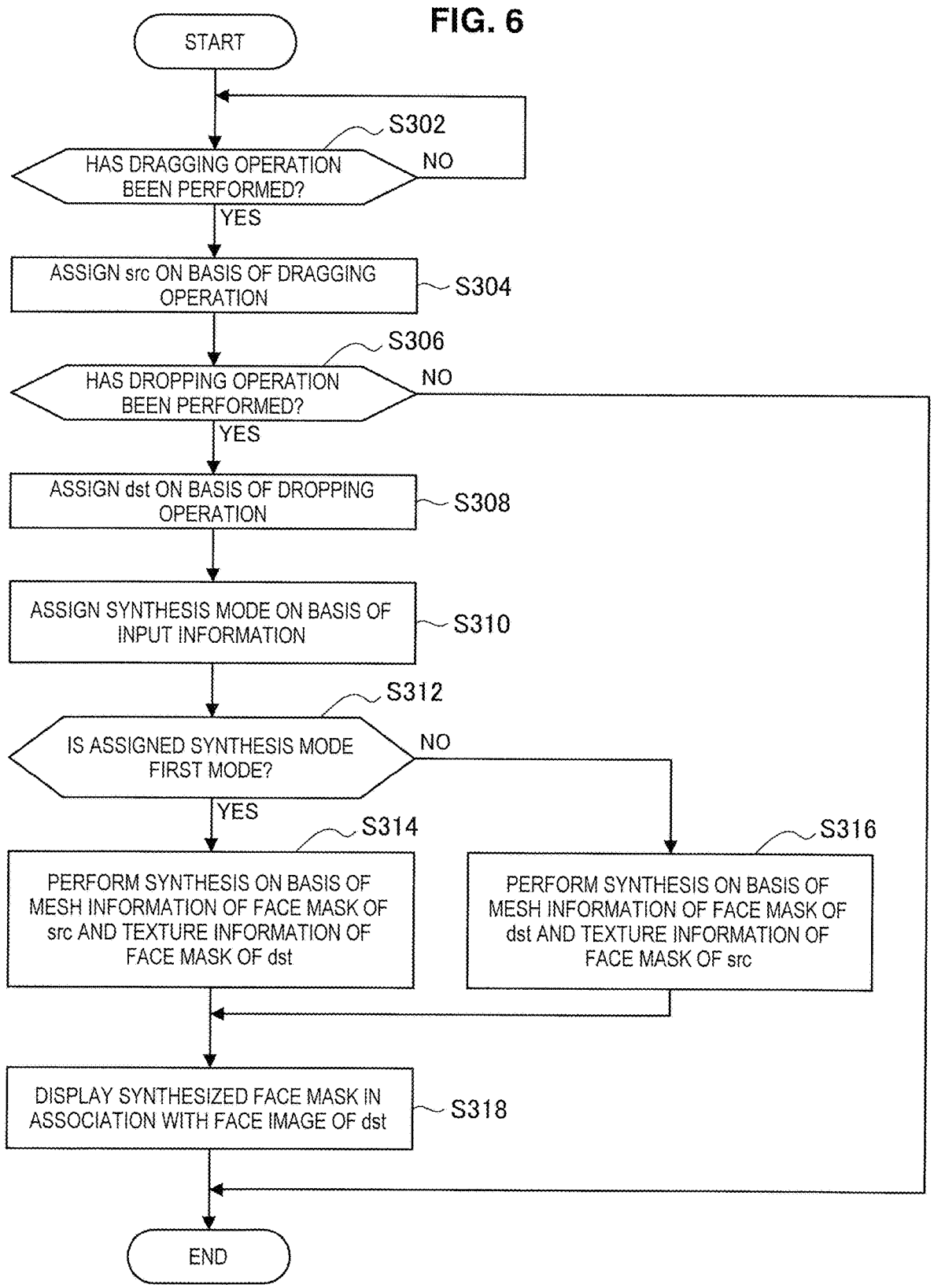
FIG. 6 is a flowchart conceptually showing processing that is performed by the information processing apparatus according to the embodiment.

Next, processing by the information processing apparatus 100-1 according to the embodiment will be described with reference to FIG. 6. FIG. 6 is a flowchart conceptually showing processing by the information processing apparatus 100-1 according to the embodiment.

The information processing apparatus 100-1 determines whether or not an operation of dragging a face mask or the like has been performed (Step S302). Specifically, the control unit 108 determines whether or not the dragging operation has been detected by the operation detection unit 106.

If it is determined that the dragging operation has been performed, the information processing apparatus 100-1 assigns src on the basis of the dragging operation (Step S304). Specifically, if the dragging operation is detected by the operation detection unit 106, the control unit 108 assigns a face mask at a start position of the detected dragging operation as src.

Next, the information processing apparatus 100-1 determines whether or not an operation of dropping the face mask or the like has been performed (Step S306). Specifically, the control unit 108 determines whether or not the dropping operation has been detected by the operation detection unit 106.

If it is determined that the dropping operation has been performed, the information processing apparatus 100-1 assigns dst on the basis of the dropping operation (Step S308). Specifically, if the dropping operation is detected by the operation detection unit 106, the control unit 108 assigns a face mask or the like at a position of the detected dropping operation as dst.

In a case in which the dropping operation is not performed normally, the processing ends. Specifically, in a case in which the dropping operation is performed at a position where no face mask or the like is present, the control unit 108 causes the processing to be ended.

Next, the information processing apparatus 100-1 assigns a synthesis mode on the basis of input information (Step S310). Specifically, the control unit 108 assigns the synthesis mode on the basis of information related to a face image assigned as src or dst or a face image corresponding to the face mask.

Next, the information processing apparatus 100-1 determines the assigned synthesis mode (Step S312). Specifically, the control unit 108 determines which of the first mode and the second mode the assigned synthesis mode is.

In a case in which the assigned synthesis mode is the first mode, the information processing apparatus 100-1 generates a synthesized face mask on the basis of mesh information of the face mask of src and texture information of the face mask of dst (Step S314). Specifically, the control unit 108 generates the synthesized face mask that includes the mesh information of the face mask of src as mesh information and the texture information of the face mask of dst as texture information in the case in which the synthesis mode is the first mode.

In a case in which the assigned synthesis mode is the second mode, the information processing apparatus 100-1 generates a synthesized face mask on the basis of mesh information of the face mask of dst and texture information of the face mask of src (Step S316). Specifically, the control unit 108 generates the synthesized face mask that includes the mesh information of the face mask of dst as mesh information and the texture information of the face mask of src as texture information in the case in which the synthesis mode is the second mode.

Next, the information processing apparatus 100-1 associates and displays the synthesized face mask with the face image of dst (Step S318). Specifically, the control unit 108 causes the generated synthesized face mask to be superimposed and displayed on the face image corresponding to the face mask of dst.

1-4. Summary of First Embodiment

According to the first embodiment of the present disclosure, the information processing apparatus 100-1 generates a synthesized object mask by synthesizing a first object mask and a second object mask and causes the generated synthesized object mask to be displayed in association with an image corresponding to the first object mask or the second object mask. Also, the information processing apparatus 100-1 controls the mode for synthesis on the basis of input information. Therefore, it is possible to perform synthesis that is desirable for the user by performing synthesis in accordance with the input information.

A first object mask includes a first face mask, a second object mask includes a second face mask, and a synthesized object mask includes a synthesized face mask. Therefore, it is possible to allow the user to enjoy the face, which is a characteristic part of a human body, being as a target of synthesis. The target of the object mask may be an object other than a human, and for example, a natural object such as a vegetable or a rock or an artificial object such as a clock. The object includes a part of an object as described above. Therefore, the target of the object mask may be another part of a human body other than the face or may be a part of an object other than a human.

The mode includes a first mode in which the synthesized face mask is generated on the basis of mesh information of the first face mask and a second mode in which the synthesized face mask is generated on the basis of mesh information of the second face mask. Therefore, it is possible to select an expression of a face of the synthesized face mask from an expression of the face of the face mask of src or dst by switching the mesh information of the synthesized face mask by the synthesis mode. As a result, convenience for the user can be improved.

In the first mode, the synthesized face mask is generated on the basis of the texture information of the second face mask. In the second mode, the synthesized face mask is generated on the basis of the texture information of the first face mask. Therefore, the synthesized face mask is automatically switched, and it is possible to improve the convenience for the user by changing the combination of the mesh information and the texture information in accordance with the synthesis mode.

The information processing apparatus 100-1 causes the synthesized face mask to be displayed in association with an image specified on the basis of a user's input from among the images corresponding to the first face mask and the second face mask. Therefore, it is possible to improve the convenience for the user by superimposing and displaying the synthesized face mask on the face image designated by the user.

The input information includes information related to the image corresponding to the first face mask or the second face mask as an input of the control processing. Therefore, it is possible to suppress a feeling of strangeness given to the user and to intentionally give the feeling of strangeness to the user in contrast by performing synthesis suitable for the face image, in particular, the face image on which the synthesized face mask is superimposed and displayed.

The aforementioned information related to the image includes information related to attributes of the aforementioned image and content of the aforementioned image.

Therefore, it is possible to reduce a processing load in the synthesis in accordance with the attributes of the image as compared with synthesis in accordance with the content of the image. Also, it is possible to perform synthesis suitable for a displayed scene by the synthesis according to the content of the image as compared with the synthesis in accordance with the attributes of the image.

In addition, the input information includes information related to a user's input operation. Therefore, it is possible to improve the convenience for the user by performing the synthesis that meets intension of the user.

The user's input operation includes an operation of selecting the first face mask or the second face mask, and the information processing apparatus 100-1 assigns the mode in accordance with the selection position of the first face mask or the second face mask. Therefore, it is possible to improve the operability by enabling the selection of the synthesis mode when the target of synthesis is selected.

The information processing apparatus 100-1 causes the selection position of the first face mask or the second face mask corresponding to each mode to be displayed in a visually distinguishable form. Therefore, the user easily knows the selection position, and it is possible to improve the convenience for the user.

At least one of the images corresponding to the first face mask and the second face mask includes an image that is temporarily recorded by image capturing. Therefore, it is possible for the user to observe how the synthesis proceeds during image capturing and to undergo trial and error. In this manner, it is possible to improve the convenience for the user.

According to the first embodiment of the present disclosure, the information processing apparatus 100-1 causes the first object mask or the second object mask to be moved, for synthesis, in response to an input based on user's motion with respect to the screen on which the object mask or the image corresponding to the object mask is displayed. Therefore, it is possible to improve an operational feeling for synthesis by moving the face mask in accordance with intentions of the user.

After completion of movement from one of the first face mask and the second face mask to the other, the information processing apparatus 100-1 causes the synthesized face mask to be displayed in association with the image corresponding to the other face mask. Therefore, it is possible to improve the operational feeling by assigning timing at which the synthesized face mask is displayed in accordance with the user's motion.

If the input based on the user's motion is interrupted, the information processing apparatus 100-1 does not perform synthesis. Therefore, it is possible to improve the convenience for the user by interrupting the synthesis in accordance with intentions of the user.

The input based on the user's motion include an operation of assigning both a start point and an end point or an operation of assigning only the start point. Therefore, the use can sensually operate the face mask, and the operability can be further improved.

The first face mask or the second face mask to be moved includes a face mask that is lined up in a face list displayed on the screen and a face mask that is generated from an image lined up in the face list. Therefore, it is possible to set a face, which does not appear on the screen, as a target of synthesis and to widen options for the user by selecting the face mask or the face image that serves as src in the face list.

The information processing apparatus 100-1 selects the face mask or the image lined up in the face list on the basis of attributes of the face expressed by the first face mask or the second face mask. Therefore, it is possible to improve a degree of satisfaction of the user with respect to the face mask or the face image listed up by lining up the face mask or the face image that suits a face as a synthesis candidate in the face list.

At least one of the first face mask and the second face mask includes a face mask of the user. Therefore, it is possible to cause the face of his or her own to be synthesized with another face, to cause another face to be synthesized with the face of his or her own, and to thereby simulate a hair style, fashion, or the like that suits the user.

1-5. Modification Examples

The first embodiment of the present disclosure has been described hitherto. The embodiment is not limited to the aforementioned example. Hereinafter, first to tenth modification examples of the embodiment will be described.

First Modification Example

According to the first modification example of the embodiment, the information processing apparatus 100-1 may generate a synthesized face mask on the basis of both mesh information pieces or both texture information pieces of targets of synthesis. Specifically, the synthesis mode includes a third mode in which the synthesized face mask is generated on the basis of mesh information of the face mask that serves as src and mesh information of the face mask that serves as dst and texture information of the face mask that serves as src and texture information of the face mask that serves as dst.

For example, the control unit 108 assigns a mesh of the synthesized face mask by causing a mesh of the face mask that serves as src and a mesh of the face mask that serves as dst to be synthesized in the third mode. For example, the mesh of the synthesized face mask in the third mode may be obtained by averaging the mesh of src and the mesh of dst. The texture is handled in the same manner as the aforementioned mesh. It is a matter of course that the third mode is controlled on the basis of the input information in the same manner as in the first mode and the second mode.

According to the first modification example of the embodiment, the synthesis mode includes the third mode in which the synthesized face mask is generated on the basis of the mesh information of the face mask that serves as src and the mesh information of the face mask that serves as dst and the texture information of the face mask that serves as src and the texture information of the face mask that serves as dst as described above. Therefore, it is possible to more finely set the degree of synthesis and to thereby address various user's needs.

Second Modification Example

According to the second modification example of the embodiment, in a case in which a plurality of face masks that become dst are present, the information processing apparatus 100-1 may generate synthesized face masks for all the plurality of face masks. Specifically, in a case in which a plurality of face masks or face images are displayed on the screen, the control unit 108 respectively generate the synthesized face mask on the basis of a moved face mask and each of the plurality of face masks or face images. Furthermore, processing according to the modification example will be described in detail with reference to FIGS. 7 and 8. FIG.

Figure 8:
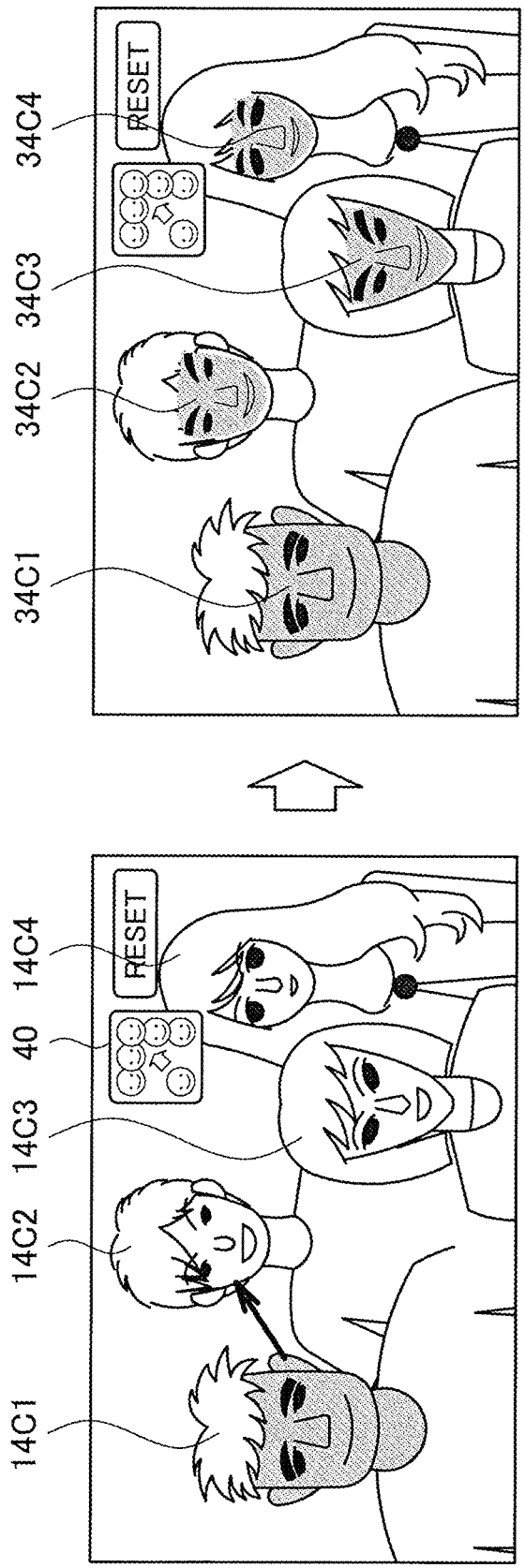
FIG. 8 is a diagram illustrating processing of generating a plurality of synthesized face masks based on a face mask selected from face images and the like that are displayed on a screen according to the second modification example of the embodiment.

7 is a diagram illustrating processing of generating a plurality of synthesized face masks on the basis of a face mask or the like selected from a face list according to the second modification example of the embodiment, and FIG. 8 is a diagram illustrating processing of generating a plurality of synthesized face mask on the basis of a face mask or the like selected from face images or the like displayed on the screen according to the second modification example of the embodiment.

Figure 7:
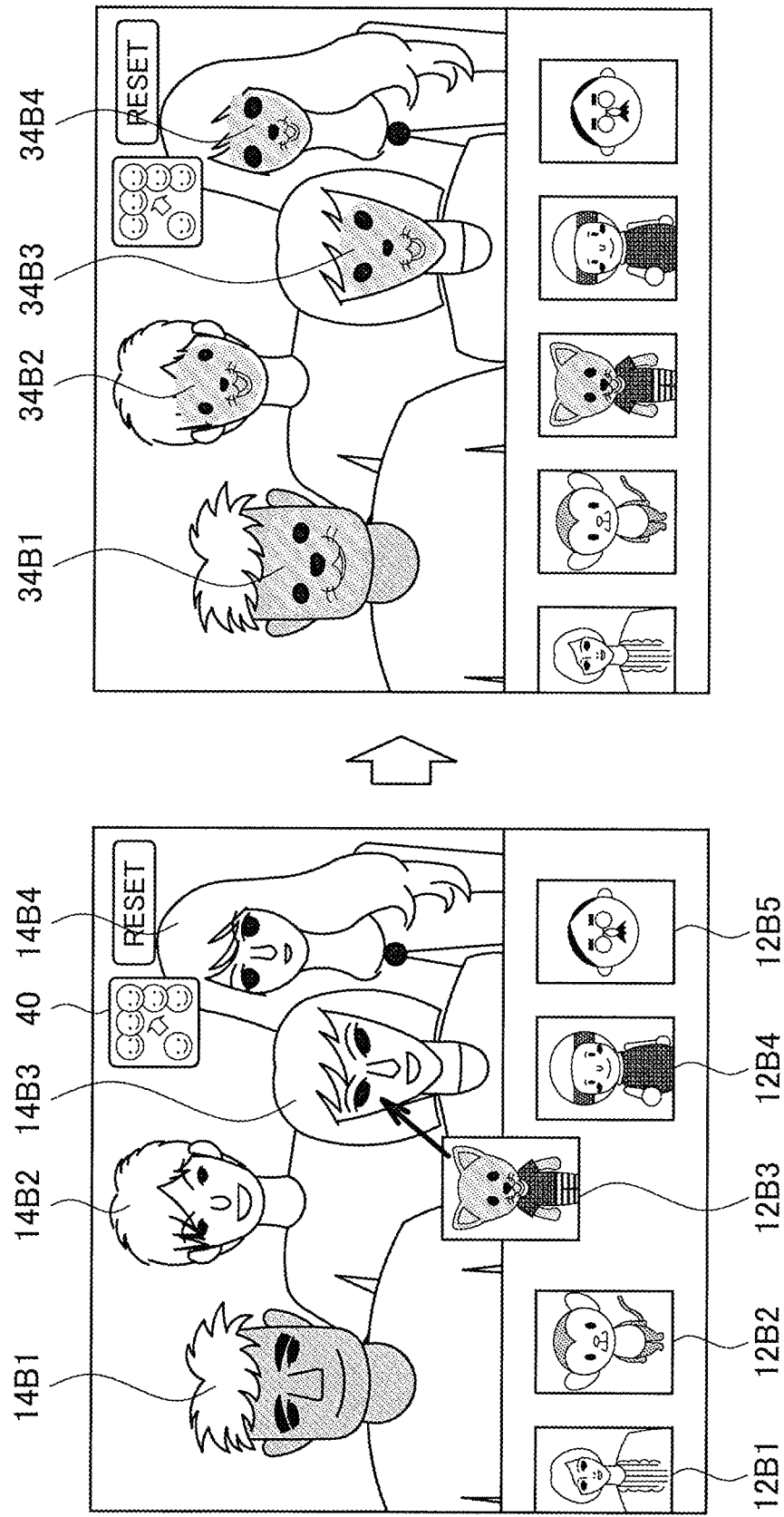
FIG. 7 is a diagram illustrating processing of generating a plurality of synthesized face masks based on a face mask or the like selected in a face list according to a second modification example of the embodiment.

The control unit 108 performs synthesis if a face mask or the like is moved to one of a plurality of face masks or face images corresponding to the face masks. For example, generation of a plurality of synthesized face mask based on the face mask or the like selected from the face list will be considered. If a face image 12B3 lined up in the face list as shown in the left diagram in FIG. 7 is moved to any of a stationary face images 14B1 to 14B4, the control unit 108 performs synthesis of each of face masks of face images 14B1 to 14B4 with a face mask of a face image 12B3 in the second mode. As a result, each of generated synthesized face mask 34B1 to 34B4 is superimposed and displayed on each of the face images 14B1 to 14B4 as shown in the right drawing in FIG. 7.

For example, generation of a plurality of synthesized face masks based on a face mask or the like that is selected from face images or the like displayed on the screen will be considered. If a stationary face image 14C1 as shown in the left drawing in FIG. 8 is moved to any of the other face images 14C2 to 14C4, for example, the control unit 108 performs synthesis of each of face masks of the face images 14C2 to 14C4 with the face mask of the face image 14C1 in the second mode. As a result, each of the generated synthesized face masks 34C2 to 34C4 is superimposed and displayed on each of the face images 14C2 to 14C4 as shown in the right drawing in FIG. 8.

The control unit 108 may perform synthesis without causing the face mask or the like that serves as src to be moved. For example, the control unit 108 performs synthesis with a plurality of face masks or the like that serve as dst if the face mask or the like that serves as src is selected.

It is a matter of course that the synthesized face mask may be generated for one selected from the plurality of face masks or the like.

The control unit 108 may switch a target of generation of the synthesized face mask on the basis of a user's operation in a case in which a plurality of face masks or the like are displayed on the screen. Specifically, the control unit 108 switch the target of generating the synthesized face mask on the basis of an operation performed on a display object. For example, if a button object 40 as shown in FIG. 8 is set to be on, the control unit 108 sets all the plurality of face masks as the targets of generation of synthesized face masks. Also, if the button object 40 as shown in FIG. 8 is set to be off, the control unit 108 sets one of the plurality of face masks or the like as a target of generation of a synthesized face mask.

According to the second modification example of the embodiment, the information processing apparatus 100-1 respectively generates a synthesized face mask on the basis of a moved face mask and each of the plurality of face masks or face images in a case in which the plurality of face masks or face images are displayed on the screen. Therefore, it is possible to omit time and efforts of the user required for synthesis with the plurality of face masks.

If the face mask or the like is moved to one of the plurality of face masks or face images corresponding to the face masks, the control unit 108 performs synthesis. Therefore, it is possible to improve easiness of operations by integrating an interface for synthesis regardless of the number of dst.

Third Modification Example

Figure 9:
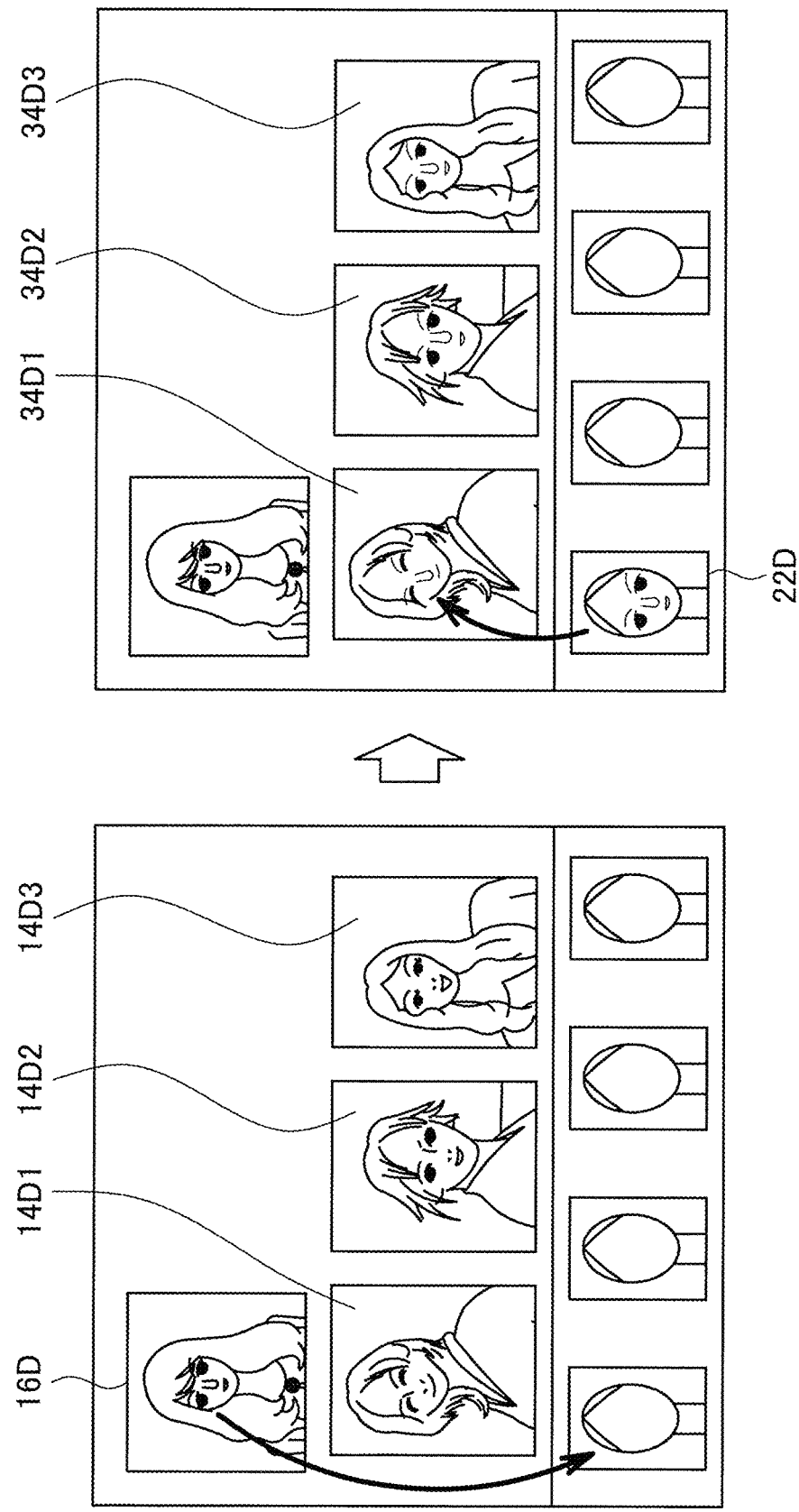
FIG. 9 is a diagram illustrating registration processing in a face list according to a third modification example of the embodiment.

According to the third modification example of the embodiment, the information processing apparatus 100-1 may register a face mask or the like in a face list on the basis of a user's operation. Specifically, the control unit 108 adds the face mask moved toward the face list to the face list. Furthermore, registration processing in the face list will be described in detail with reference to FIG. 9. FIG. 9 is a diagram illustrating registration processing in a face list according to the third modification example of the embodiment.

The control unit 108 prepares a registration frame in a face list. Although no face mask or the like is lined up in the face list as shown in the left diagram in FIG. 9 before the registration in the face list, objects indicating frames in which registration can be made are lined up.

Next, if the face mask or the like moves to the face list, the control unit 108 adds the face mask or the like to the face list. If the face mask generated from a through face image 16D as shown on the left upper side in the left drawing in FIG. 9 is moved by the user to the face list, for example, the control unit 108 adds a face mask 22D to the face list as shown in the right diagram in FIG. 9.

Next, the control unit 108 performs synthesis by using the face mask or the like registered in the face list as src. For example, the control unit 108 generate the synthesized face mask by using the face mask 22D as src and each face image at a destination of movement as dst in the second mode by causing the face mask 22D registered in the face list to be moved to the face images 14D1 to 14D3. Then, each of the generated synthesized face masks 34D1 to 34D3 is superimposed and displayed on each of the face images 14D1 to 14D3.

If the face images are moved to the face list, the control unit 108 may register the face masks generated from the face images in the face list. If the user causes his or her face or the information processing apparatus 100-1 to be moved such that his or her face that appears in a through image moves to the face list, for example, the control unit 108 generates a face mask from the user's face in the through image and register the generated face mask in the face list.

The control unit 108 may register a face mask in the face list on the basis of an operation that is not accompanied by movement of the face mask or the like. In a case in which a selection operation, such as a tough operation, on a face mask or the like is continued for predetermined time, for example, the control unit 108 adds the face mask related to the selection operation to the face list. In such a case, the control unit 108 may cause a GUI for checking availability of registration to be displayed after detection of the continuation of the selection operation. The control unit 108 may add an image selected by the user from among images obtained by image capturing and images stored in the storage unit 110.

The control unit 108 may automatically generate the face list. For example, the control unit 108 generates a face mask for a face that appears in an image (including a stationary image, a moving image, and a through image) obtained by image capturing and adds the generated face mask to the face list. Also, the control unit 108 may generate a face mask for a face that is an object during image capturing and adds the generated face mask to the face list. Also, the face mask once registered may be updated. For example, if a face image or a face mask that directs toward a direction close to a front side than face masks that have already been registered is acquired, the control unit 108 registers the newly acquired face mask instead of the face mask that has already been registered.

A face mask or the like may be deleted from the face list. Specifically, the control unit 108 deletes the face mask or the like from the face list on the basis of a user's operation. In a case in which the face mask or the like lined up in the face list is moved to the outside of the face list by a dragging and dropping operation, for example, the control unit 108 deletes the moved face mask or the like from the face list.

The control unit 108 may automatically delete a face mask or the like from the face list. For example, the control unit 108 deletes a face mask or the like for which predetermined time has elapsed after registration in the face list. Also, the control unit 108 may delete a face mask or the like outside an imaging range from the face list. If image capturing ends or an imaging screen is printed, the control unit 108 may delete a face mask or the like from the face list. Also, the control unit 108 may delete a face mask or the like on the basis of position information of the user. When the user leaves a predetermined region, the control unit 108 deletes a face mask or the like corresponding to the predetermined region.

According to the third modification example of the embodiment, the information processing apparatus 100-1 adds a face mask moved toward the face list to the face list as described above. Therefore, the user can sensually create the face list, and the operability can be improved.

Fourth Modification Example

Figure 10:
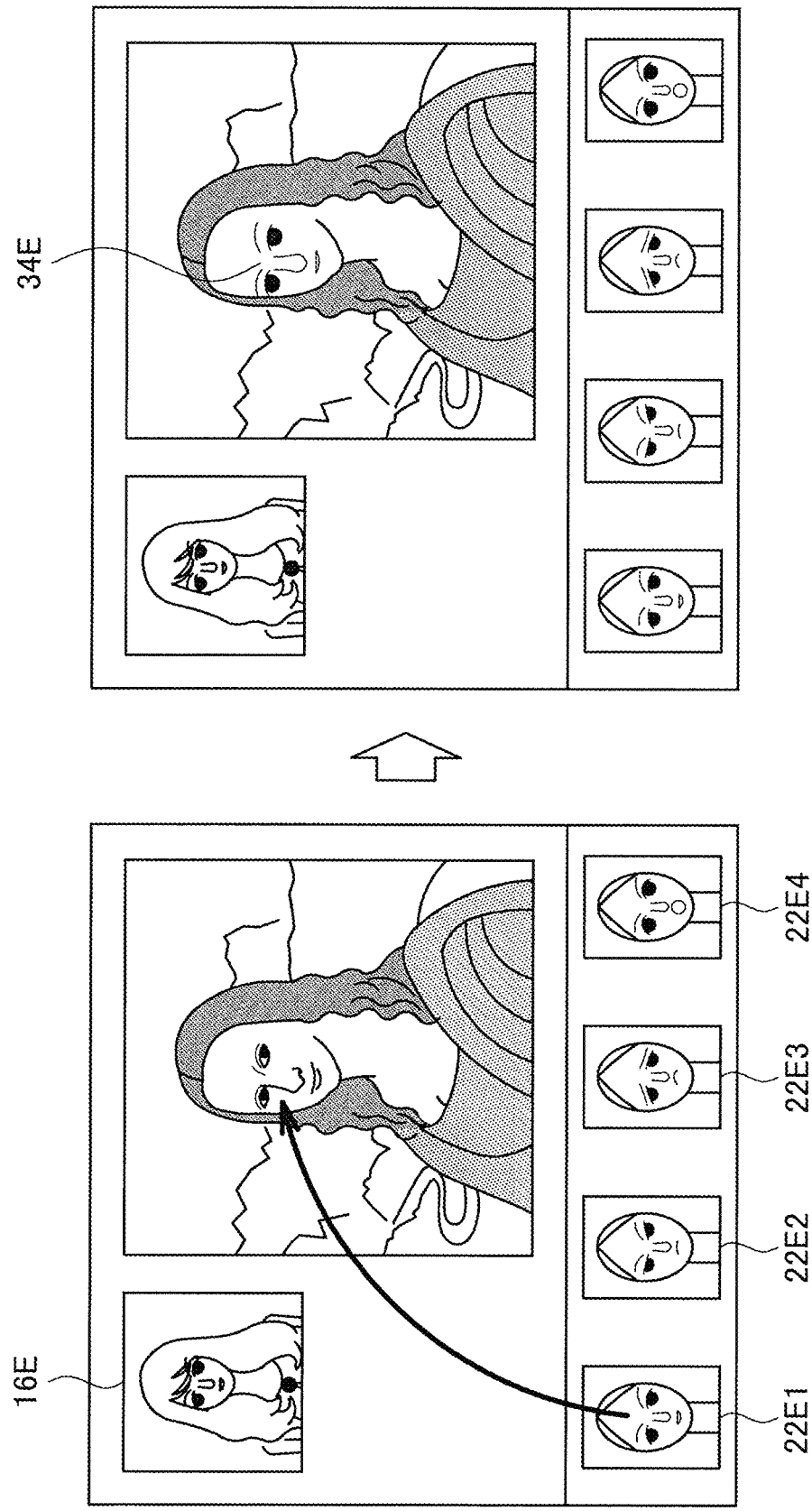
FIG. 10 is a diagram illustrating synthesis processing according to a fourth modification example of the embodiment.

According to the fourth modification example of the embodiment, the information processing apparatus 100-1 may cause a synthesized face mask to be displayed in association with a face other than a real human face. Specifically, a face mask used for synthesis includes a face mask of an artificially generated face (hereinafter, also referred to as an artificial face). For example, the control unit 108 synthesizes the face mask generated from the face image of the artificial face with another face mask. Then, the control unit 108 causes the synthesized face mask obtained by the synthesis to be superimposed and displayed on the face image of the artificial face. Furthermore, processing according to the modification example will be described with reference to FIG. 10. FIG. 10 is a diagram illustrating synthesis processing according to the fourth modification example of the embodiment.

The artificial face includes a face depicted as a picture. If a face mask generated from a through face image 16E is moved toward a face image 14E of a woman face that is depicted as a picture as shown in the left diagram in FIG. 10, for example, the control unit 108 synthesizes a face mask generated from the face image 14E with the moved face mask in the second mode. Then, the control unit 108 causes a synthesized face mask 34E obtained by the synthesis to be superimposed and displayed on the face image 14E as shown in the right drawing in FIG. 10. It is a matter of course that a face mask registered in the face list, for example, a face mask 22E1 may be used for synthesis instead of the face mask generated from the through face image 16E.

The artificial face may be a face created by CG. A natural object such as a vegetable or a rock that is in a face-like form though it is not an artificial object may be used instead of the artificial face.

According to the fourth modification example of the embodiment, the face mask used for synthesis includes a face mask of an artificially generated face as described above. Therefore, it is possible to address various user's needs by expanding targets of synthesis.

Fifth Modification Example

According to the fifth modification example of the embodiment, the information processing apparatus 100-1 may present a prior display of a second synthesized face mask (hereinafter, also referred to as a preview of a synthesized face mask) related to the synthesized face mask. Specifically, the preview of the synthesized face mask includes causing a face mask, which is being moved, to be changed into the second synthesized face mask, and the second synthesized face mask includes a synthesized face mask. For example, the control unit 108 causes a face mask that is selected as a target of movement to be changed into a synthesized face mask obtained by synthesizing the face mask with a face mask estimated as a movement destination. In a case in which the moving operation is a dragging operation, for example, the control unit 108 performs preview by using a face mask that is present in a dragging direction as a face mask that serves as dst. A swiping operation or a flicking operation is also performed in the same manner as in the case of the dragging operation.

The second synthesized face mask includes a synthesized face mask obtained by causing face feature information in the synthesized face mask to be changed in accordance with information related to movement of the face mask, which is being moved. Specifically, the face feature information of the synthesized face mask related to the preview is changed in accordance with a distance between the face mask that serves as src and the face mask that serves as dst, which changes by the movement. For example, the control unit 108 causes the face mask that is being moved to be changed to the synthesized face mask that is closer to the synthesized face mask after the movement as the distance decreases. More specifically, the control unit 108 causes a mesh and texture of the face mask, which is being moved, to further approach a mesh and texture of the synthesized face mask as the distance decreases. The moving operation may be a dragging operation or a swiping operation.

The face feature information of the synthesized face mask related to the preview may be changed in accordance with a moving direction of the face mask. If the face mask is moved in a predetermined direction, for example, the control unit 108 causes the moved face mask to be changed into a synthesized face mask in which a mesh and texture of the face mask of src are emphasized. In addition, if the face mask is moved in a direction opposite to the predetermined direction, the control unit 108 causes the moved face mask to be changed into a synthesized face mask in which the mesh and the texture of the face mask of dst are emphasized.

Also, the face feature information of the synthesized face mask related to the preview may be changed in accordance with a moving speed of the face mask. For example, the control unit 108 causes the mesh and the texture of the moved face mask to further approach the mesh and the texture of the synthesized face mask as the moving speed of the face mask becomes higher. In a case in which the moving speed is equal to or greater than a threshold value, the control unit 108 may cause the moved face mask to be changed into the synthesized face mask.

Figure 11:
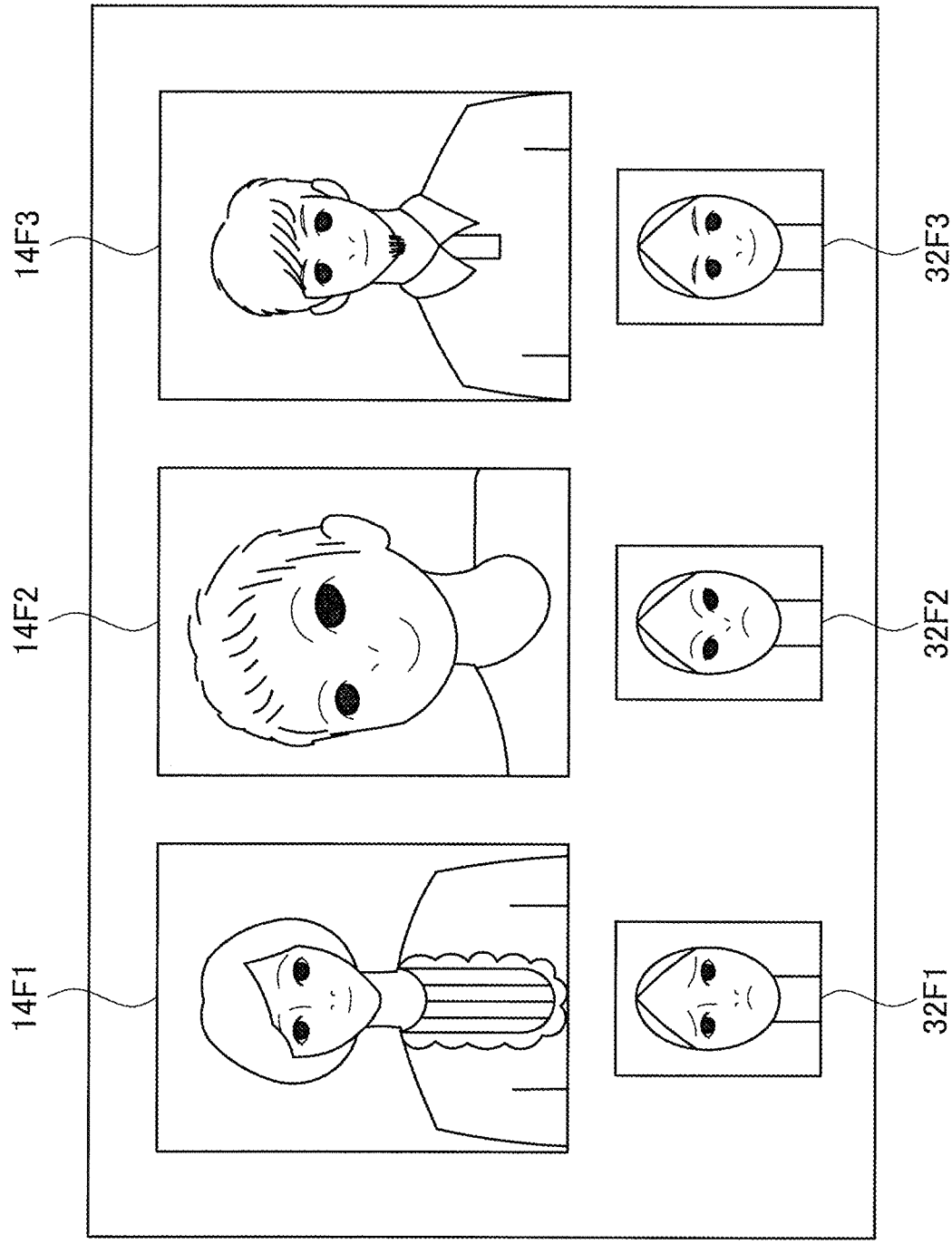
FIG. 11 is a diagram illustrating a preview in a face list according to a fifth modification example of the embodiment.

The preview of the synthesized face mask may be causing a face mask lined up in the face list or a face mask generated from a face image lined up to be changed into the second synthesized face mask. Specifically, the control unit 108 causes a face mask that is lined up in the face list, a face mask that is selected from among the face images, or a face mask that is generated from the selected face image to be changed into the second synthesized face mask. Furthermore, the preview in the face list will be described in detail with reference to FIG. 11. FIG. 11 is a diagram illustrating the preview in the face list according to the fifth modification example of the embodiment.

The control unit 108 synthesizes one face mask or each of a plurality of face masks selected from the face list by a user's operation with a face mask of a face on a screen, which has been recognized by the face recognition unit 104. For example, the control unit 108 respectively synthesizes face masks lined up in the face list with face masks generated from face images 14F1 to 14F3 that respectively correspond to the face masks in the first mode.

Then, the control unit 108 respectively causes each of the generated synthesized face masks to be displayed instead of the selected corresponding face masks in the face list. For example, the control unit 108 causes synthesized face masks 32F1 to 32F3 to be displayed instead of the face masks in the face list as shown in FIG. 11. In a case in which a face image is selected in the face list, the synthesized face mask may be superimposed and displayed on the face image.

The control unit 108 may use all face masks or the like lined up in the face list as targets of preview. The targets of preview may be switched on the basis of a user's operation.

The synthesized face mask in the preview may be updated on the basis of the mesh information of src or dst. For example, a face expression of the synthesized face mask in the preview is changed in accordance with motion of the face of src or dst.

Although the example in which the face mask or the like that serves as dst is changed into the synthesized face mask has been described hitherto, the face mask or the like that serves as src may be changed into the synthesized face mask.

Although the example in which the preview is performed by changing the face mask or the like as a target of synthesis into the synthesized face mask has been described hitherto, an additional screen for the preview may be provided, and the preview of the synthesized face mask may be displayed on the screen.

According to the fifth modification example of the embodiment, the information processing apparatus 100-1 presents a prior display of the second synthesized face mask related to the synthesized face mask. Therefore, since a state after the synthesis is presented in advance, the user can decide whether or not to execute synthesis before the synthesis, and the convenience for the user can be improved.

The prior display of the second synthesized face mask includes causing the face mask, which is being moved, to be changed into the second synthesized face mask. Therefore, since the preview of the synthesized face mask is performed during a moving operation for synthesis, it is possible for the user to determine whether or not to execute the synthesis during movement.

The second synthesized face mask includes a synthesized face mask in which face feature information of the synthesized face mask is changed in accordance with a distance between the face mask that serves as src and the face mask that serves as dst. Therefore, the user can check the process of the synthesis through a moving operation, and it is possible to provide a fan to the user.

The prior display of the second synthesized face mask includes causing face masks lined up in the face list or face masks generated from face images lined up in the face list to be changed into the second synthesized face masks. Therefore, since the face masks lined up in the face list become targets of the preview, the user can observe the preview without performing a moving operation.

The information processing apparatus 100-1 causes a face mask selected from face masks or face images lined up in the face list or all the face masks to be changed into the second synthesized face mask or second synthesized face masks.

Therefore, since only the face masks intended by the user are regarded as targets of preview, the user can focus on and observe the synthesize face masks that the user desires to check.

Sixth Modification Example

Figure 12:
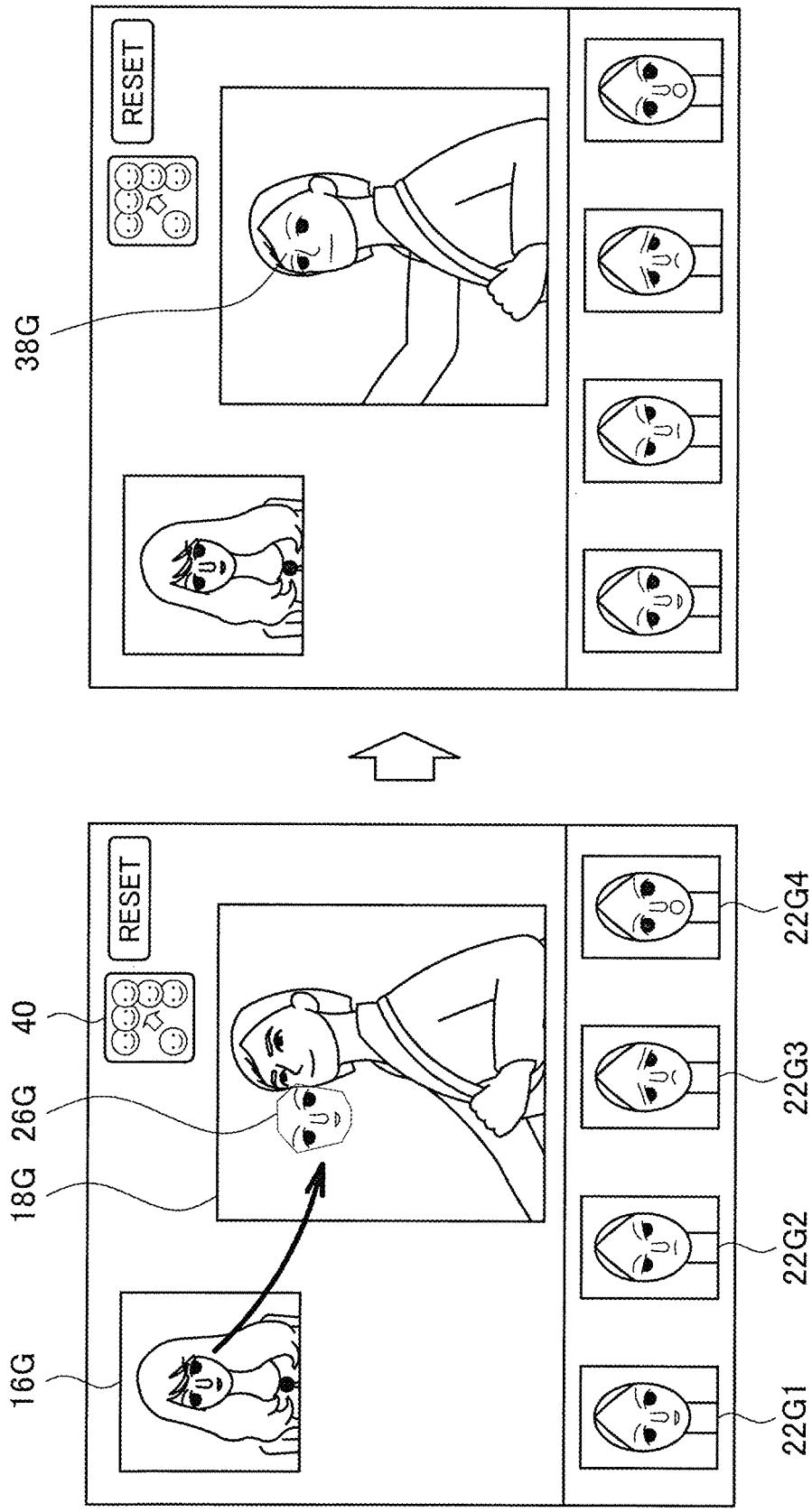
FIG. 12 is a diagram illustrating synthesis processing in a case in which no face mask is secured according to a sixth modification example of the embodiment.
Figure 13:
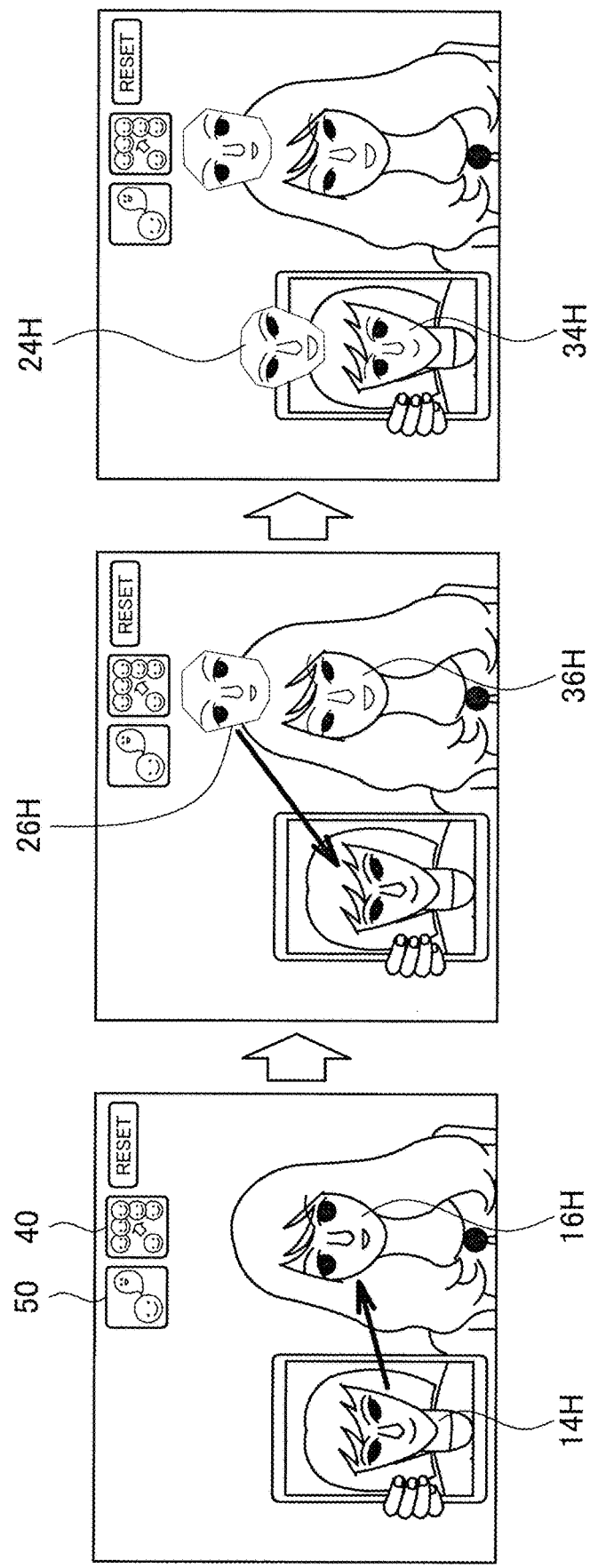
FIG. 13 is a diagram illustrating synthesis processing in a case in which a face mask is secured according to the sixth modification example of the embodiment.

According to the sixth modification example of the embodiment, the information processing apparatus 100-1 may secure a face mask of a face image, on which the synthesized face mask is superimposed and displayed, when the synthesized face mask is superimposed and displayed. Specifically, the control unit 108 causes a face mask corresponding to an image associated with a synthesized face mask to be displayed to be adjacent to the synthesized face mask when the synthesized face mask is displayed. Furthermore, processing according to the modification example will be described in detail with reference to FIGS. 12 and 13. FIG. 12 is a diagram illustrating synthesis processing in a case in which a face mask is not secured according to the sixth modification example of the embodiment, and FIG. 13 is a diagram illustrating synthesis processing in a case in which a face mask is secured according to the sixth modification example of the embodiment.

First, a case in which the face mask is not secured will be described. The control unit 108 generates a synthesized face mask if a face mask that serves as src is moved to a face mask or the like that serves as dst. If a face mask 26G that is generated from a through face image 16G is moved to a moving face image 18G by a dragging operation as shown in the left diagram in FIG. 12, the control unit 108 synthesizes the face mask 26G and a face mask generated from the face image 18G in the second mode.

Next, the control unit 108 causes the generated synthesized face mask to be superimposed and displayed on the face image that serves as dst. For example, the control unit 108 causes the generated synthesized face mask 38G to be superimposed and displayed on the face image 18G that serves as dst. Here, since the synthesized face mask 38G is superimposed and displayed on the face image 18G, it is difficult for the user to perform an operation of generating the face mask from the face image 18G on the face image 18G in a case in which the user desires to generate the face mask of the face image 18G. Thus, the face mask is secured in the information processing apparatus 100-1 as will be described later.

If the face mask that serves as src is moved to the face mask or the like that serves as dst, the control unit 108 generates the synthesized face mask. If a face mask generated from a stationary face image 14H is moved to a through face image 16H by a dragging operation as shown in the left diagram in FIG. 13, the control unit 108 synthesizes the moved face mask with the face mask generated from the face image 16H in the second mode.

Next, the control unit 108 causes the generated synthesized face mask to be superimposed and displayed on the face image that serves as dst and causes the face mask generated from the face image that serves as dst to be displayed at a position adjacent to the synthesized face mask. As illustrated in the left diagram in FIG. 13, for example, the control unit 108 causes the generated synthesized face mask 36H to be superimposed and displayed on the face image 16H that serves as dst and causes a face mask 26H generated from the face image 16H to be displayed on the synthesized face mask 36H, that is, the face image 16H.

The secured face mask can be moved and synthesized in the same manner as in the aforementioned face masks. If the face mask 26H generated to be secured is moved to the face image 14H as shown in the center diagram in FIG. 13, for example, the control unit 108 synthesizes the face mask 26H and the face mask generated from the face image 14H in the second mode.

Next, the control unit 108 causes the generated synthesized face mask to be superimposed and displayed on the face image that serves as dst and causes the face mask generated from the face image that serves as dst to be displayed at a position adjacent to the synthesized face mask. For example, the control unit 108 causes the generated synthesized face mask 34H to be superimposed and displayed on the face image 14H and causes a face mask 24H generated from the face image 14H to be displayed on the synthesize face mask 34H, that is, the face image 14H. As a result, display is performed such that face related to the face image has been switched.

Whether to secure the aforementioned face mask may be switched. Specifically, the control unit 108 switches whether to secure the face mask on the basis of a user's operation. For example, the control unit 108 switches whether to secure the face mask in accordance with switching between on and off of the button object 50 as shown in the left diagram in FIG. 13.

According to the sixth modification example of the embodiment, the information processing apparatus 100-1 causes the face mask corresponding to the image associated with the synthesized face mask to be displayed to be adjacent to the synthesized face mask when the synthesized face mask is displayed as described above. Therefore, it is possible to perform an operation on the face mask of the face image on which the synthesized face mask is superimposed and displayed, and to thereby improve the convenience for the user.

Seventh Modification Example

Figure 14:
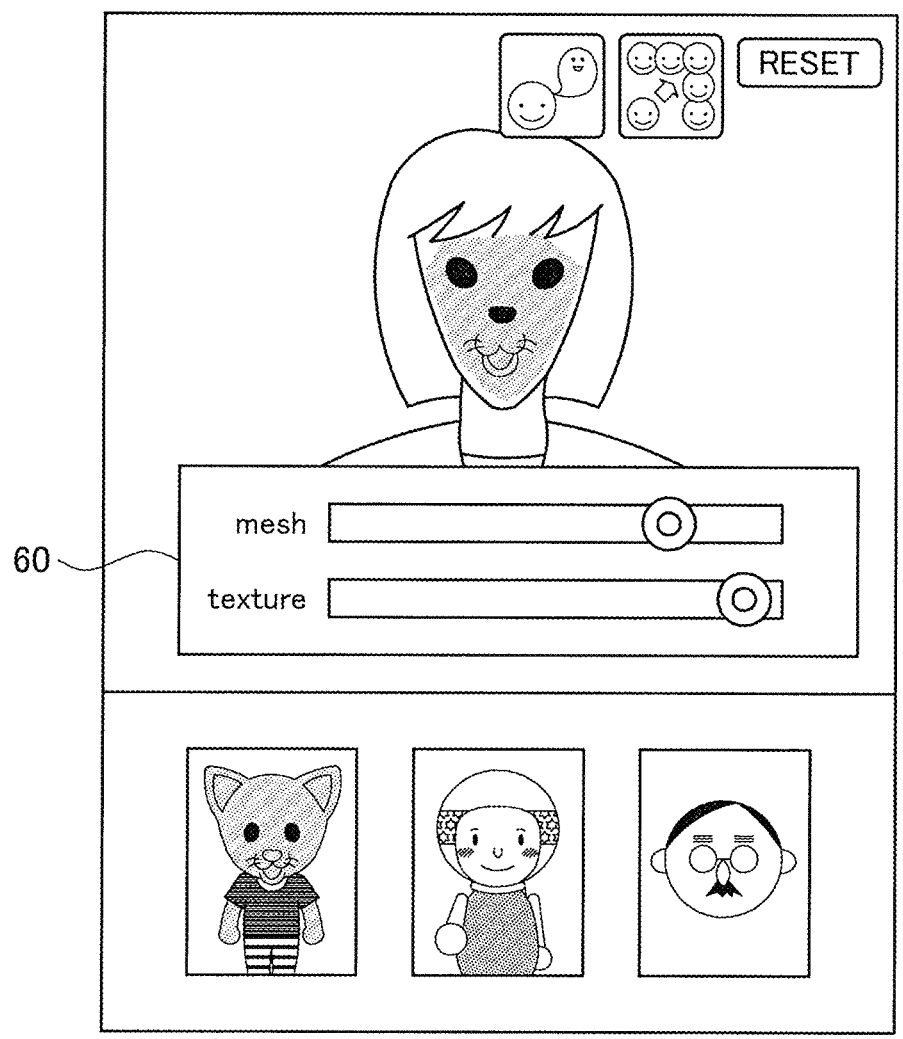
FIG. 14 is a diagram showing an example of an interface for adjusting face feature information in a synthesized face mask according to a seventh modification example of the embodiment.

According to the seventh modification example of the embodiment, the information processing apparatus 100-1 may change face feature information of the synthesized face mask. Specifically, the control unit 108 changes face feature information of the synthesized face mask on the basis of input information. More specifically, the control unit 108 changes the face feature information of the synthesized face mask between face feature information of the face mask that serves as src and face feature information of the face model that serves as dst on the basis of a user's input operation. Furthermore, processing according to the modification example will be described in detail with reference to FIG. 14. FIG. 14 is a diagram showing an example of an interface for adjusting face feature information of a synthesized face mask according to the seventh modification example of the embodiment.

The control unit 108 provides interface for adjusting the face feature information of the synthesized face mask to the user. For example, the control unit 108 causes a GUI 60 as shown in FIG. 14 to be displayed. The GUI 60 includes an interface like a slider for adjusting mesh information of the synthesized face mask and an interface like a slider for adjusting texture information of the synthesized face mask. For example, the left end of the slider corresponds to src while the right end of the slider corresponds to dst.

In a case in which a finger grip of the slider for the mesh information is set at the left end and a finger grip of the slider for the texture information is set at the right end, the face feature information of the synthesized face mask corresponds to face feature information in the aforementioned first mode. In a case in which the respective finger grips of the two sliders are respectively set in the opposite manner, the feature information of the synthesized face mask corresponds to the face feature information in the aforementioned second mode. In a case in which the respective finger grips of the two sliders are set between the left end and the right end, the face feature information of the synthesized face mask corresponds to the face feature information in the aforementioned third mode.

Then, the control unit 108 causes display of the synthesized face mask to be changed on the basis of the face feature information set through the interface. For example, the control unit 108 changes mesh information and texture information of the synthesized face mask as shown in FIG. 14 into mesh information and texture information set by the sliders in the GUI 60. The control unit 108 may cause the synthesized face mask to be changed in real time in response to an operation on the GUI 60 or may cause the synthesized face mask to be changed after completion of an operation on the GUI 60, for example, after an ending operation.

Figure 15A:
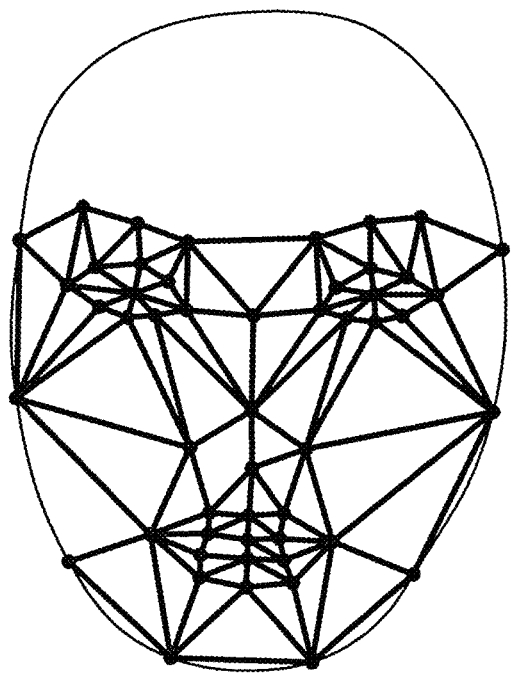
FIG. 15A is a diagram illustrating processing of changing mesh information in the synthesized face mask according to the seventh modification example of the embodiment.
Figure 15B:
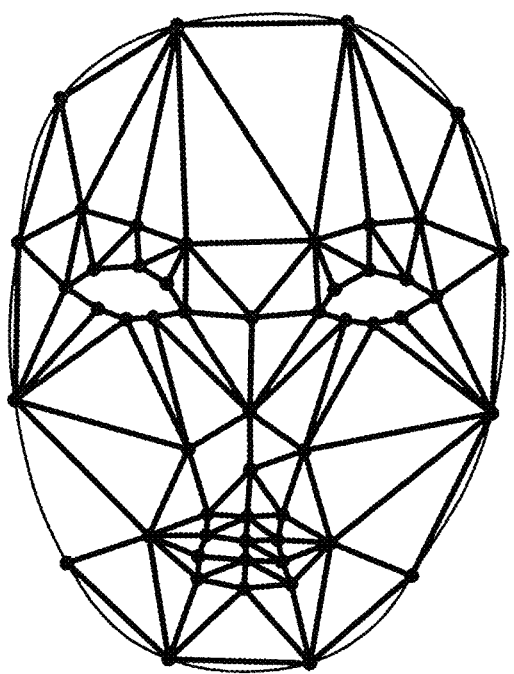
FIG. 15B is a diagram illustrating processing of changing mesh information in the synthesized face mask according to the seventh modification example of the embodiment.
Figure 15C:
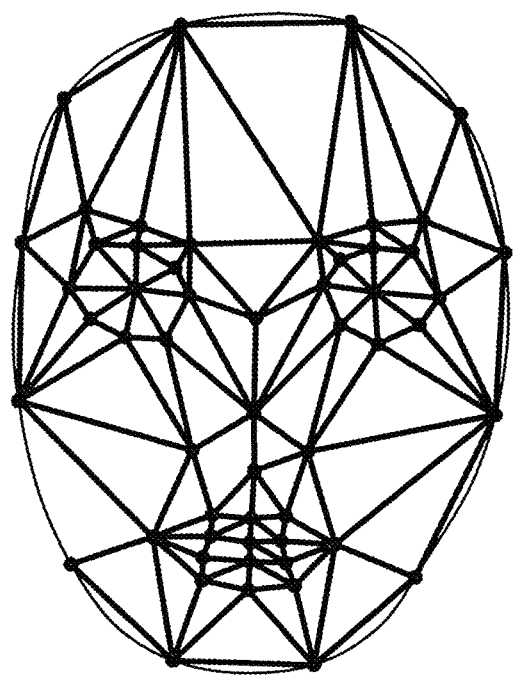
FIG. 15C is a diagram illustrating processing of changing mesh information in the synthesized face mask according to the seventh modification example of the embodiment.

The face feature information of the synthesized face mask may be changed regardless of the face feature information of the face masks that serve as src and dst. Specifically, the control unit 108 changes the mesh information of the synthesized face mask on the basis of attribute information of the face mask that serves as src or the face mask that serves as dst. Furthermore, the configuration will be described in detail with reference to FIGS. 15A to 15C. FIGS. 15A to 15C are diagrams illustrating processing of changing the mesh information of the synthesized face mask according to the seventh modification example of the embodiment.

The control unit 108 selects a mesh type on the basis of the attribute information of the mask and changes the mesh information on the basis of the selected mesh type. For example, types of a face wear such as a facial mask or a medical mask, a cartoon or CG character, or presence of front bangs is exemplified are exemplified as the attribute information of the face mask. In a case in which the type of the face mask is a face wear, for example, the control unit 108 selects a mesh type that drops out at a part of a face, such as a forehead or eyes as shown in FIG. 15A or FIG. 15B. In a case in which the type of the face mask is a character, the control unit 108 selects a mesh type that is set to be greater than the other mesh types such that a part of a face, such as eyes, is deformed as shown in FIG. 15C.

Figure 16:
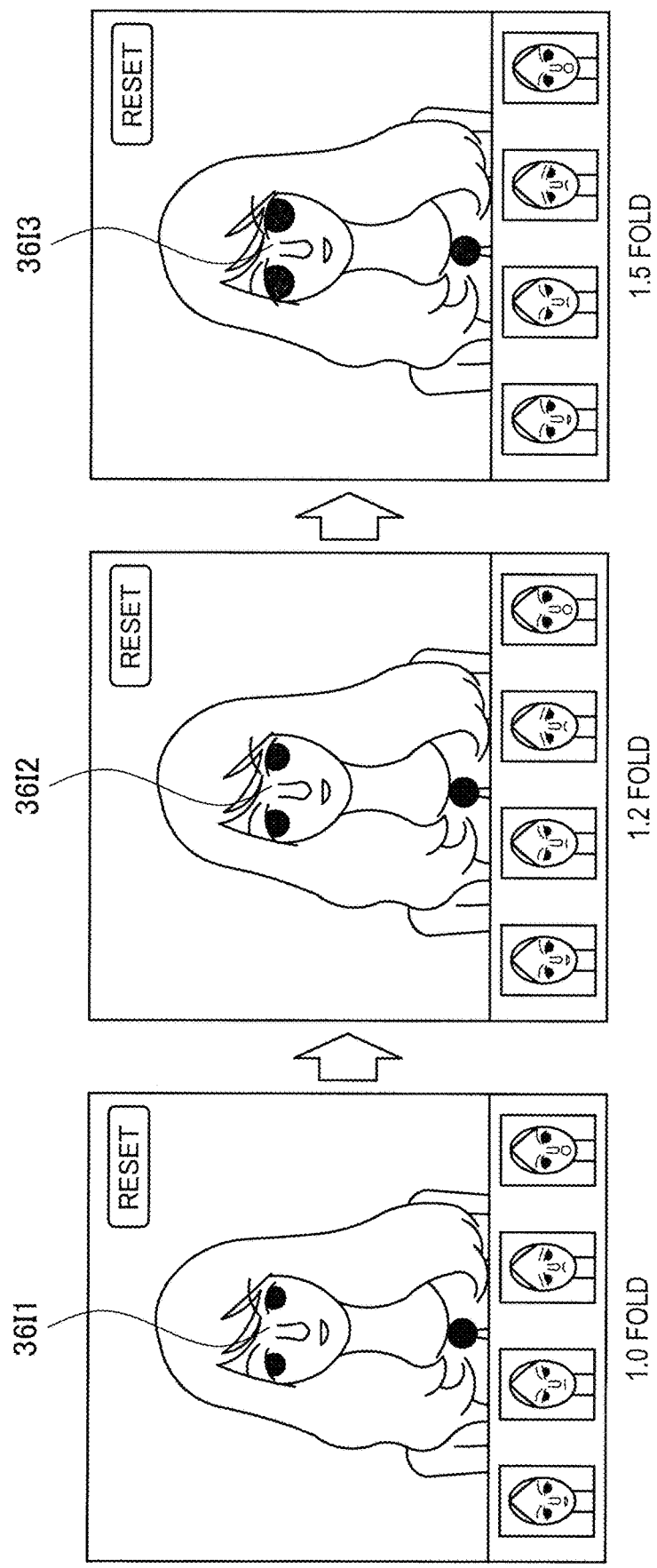
FIG. 16 is a diagram illustrating another example of the processing of changing the mesh information in the synthesized face mask according to the seventh modification example of the embodiment.

The control unit 108 may dynamically change the mesh information instead of or in addition to selection of the mesh type. This configuration will be described in detail with reference to FIG. 16. FIG. 16 is a diagram illustrating another example of processing of changing mesh information of a synthesized face mask according to the seventh modification example of the embodiment.

The control unit 108 dynamically changes the mesh information in response to a user's operation. Specifically, the control unit 108 changes a part of the mesh information to have a size selected by the user's operation. For example, the control unit 108 causes a size of a part corresponding to eyes in the mesh to be changed to 1.0 to 1.5 folds set by the user's operation as in the synthesized face masks 36I1 to 36I3 shown in FIG. 16.

Figure 17:
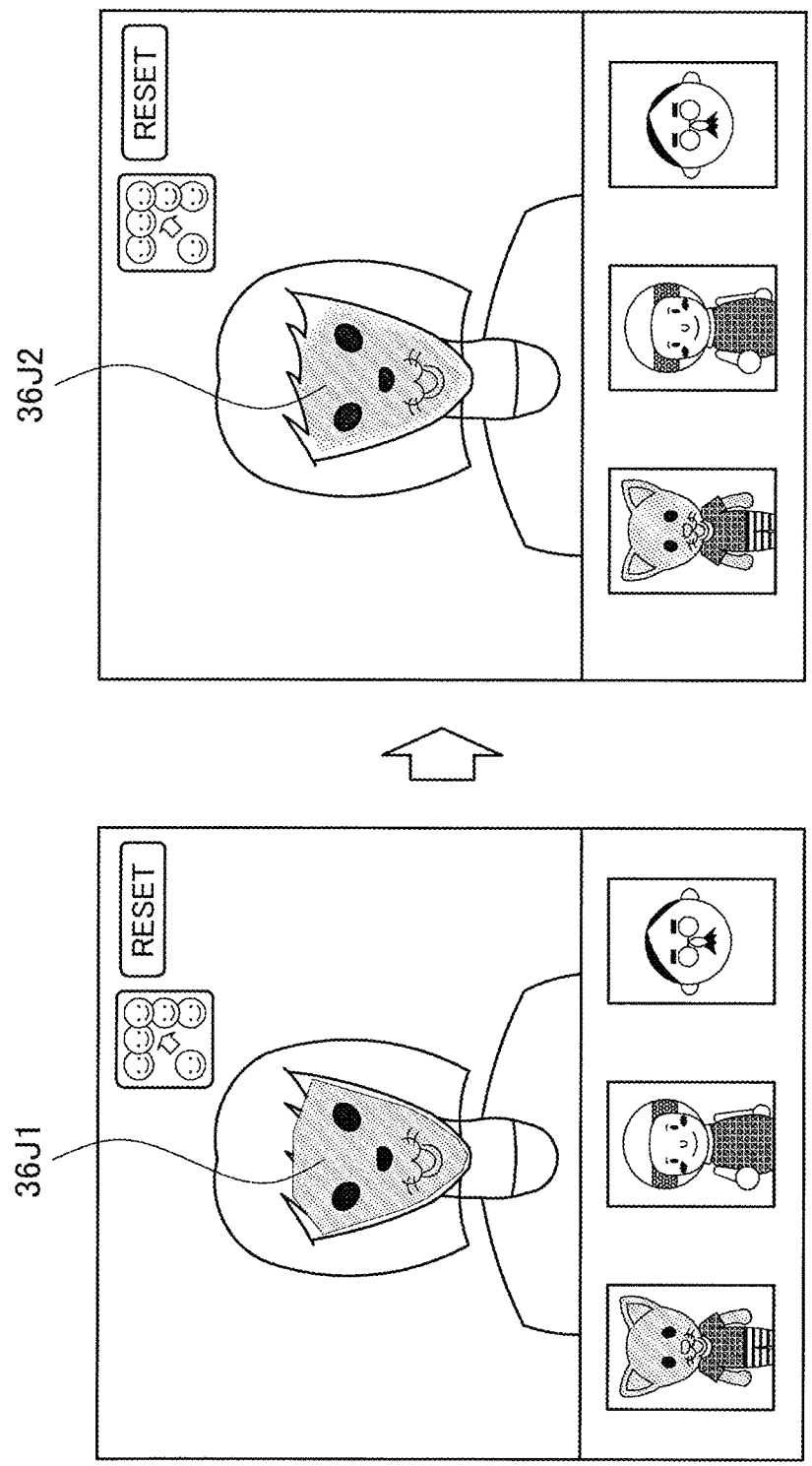
FIG. 17 is a diagram illustrating processing of changing texture information in the synthesized face mask according to the seventh modification example of the embodiment.
Figure 18:
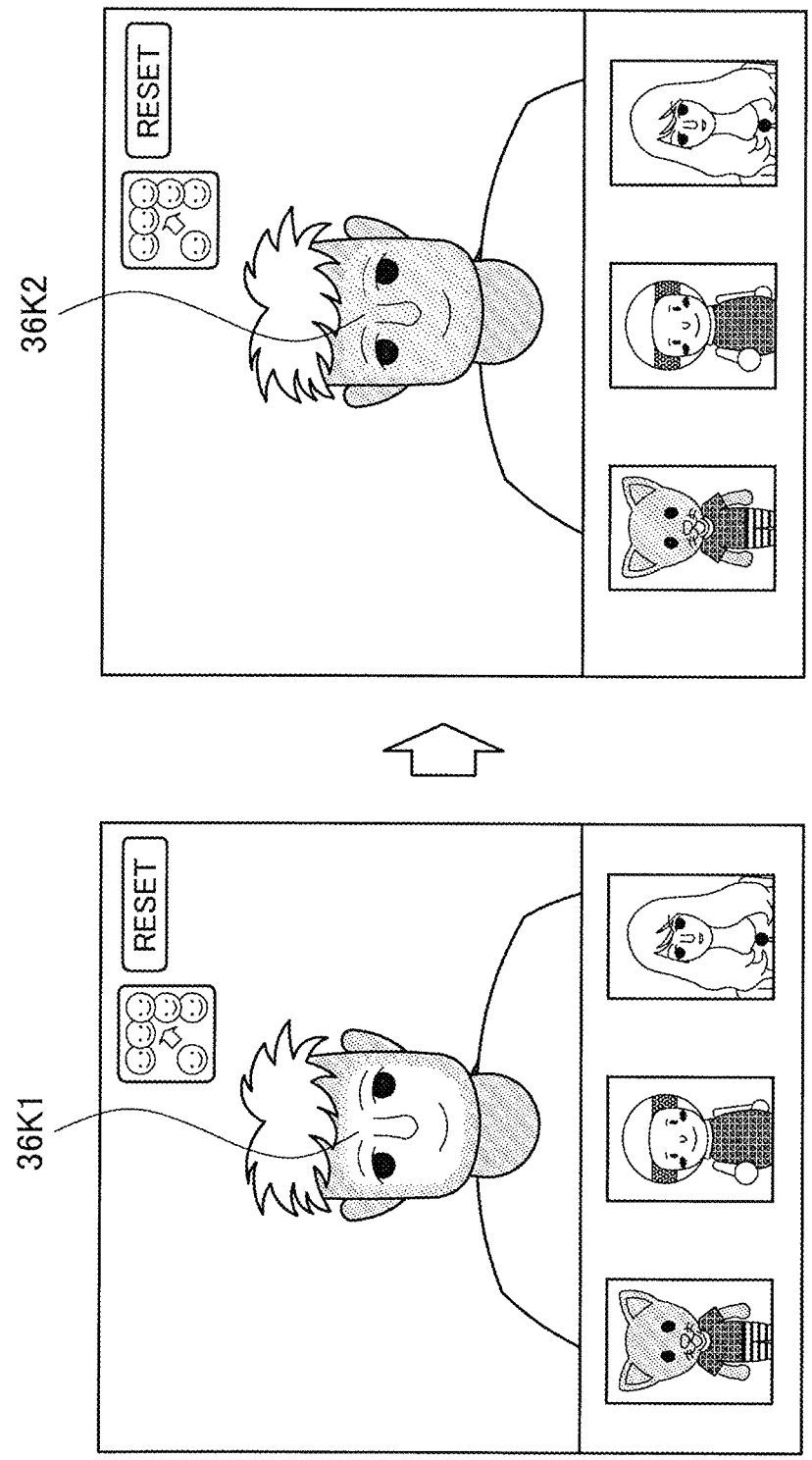
FIG. 18 is a diagram illustrating processing of changing texture information in the synthesized face mask according to the seventh modification example of the embodiment.

The control unit 108 may change texture information of the synthesized face mask on the basis of a face image with which the synthesized face mask is associated or the face mask of the target of synthesis. Specifically, the control unit 108 changes the texture information of the synthesized face mask on the basis of a comparison between texture information of the face mask that serves as src and texture information of the face mask or the like that serves as dst. Furthermore, this configuration will be described in detail with reference to FIGS. 17 and 18. FIGS. 17 and 18 are respectively diagrams for illustrating processing of changing the texture information of the synthesized face mask according to the seventh modification example of the embodiment.

First, a case in which the texture information is not changed will be described. If the synthesized face mask is generated, the control unit 108 causes the generated synthesized face mask to be superimposed and displayed on the face image that serves as dst. For example, the control unit 108 causes a synthesized face mask 36J1 as shown in the left diagram in FIG. 17 to be displayed. Here, since a color tone of the texture of the synthesized face mask 36J1 is different from a color tone of the face image that is superimposed and displayed, there is a possibility that the user feels that the synthesis is unnatural. Thus, the control unit 108 changes transparency of the texture of the synthesized face mask in accordance with a degree of a visual difference between the texture of the face mask that serves as src and the texture of the face mask that serves as dst.

Specifically, the control unit 108 changes the transparency of the texture of the synthesized face mask in accordance with a degree of difference in luminance or in color attributes (color phases, brightness, or saturation) of the texture of the face mask that serves as src and the texture of the face mask that serves as dst. For example, the control unit 108 raises transparency of the texture in the periphery of the outline of the synthesized face mask as a synthesized face mask 36J2 shown in the right drawing in FIG. 17. In this manner, it is possible to suppress the feeling of strangeness.

The control unit 108 may change the color attributes of the texture instead of or in addition to the change of the transparency of the texture. Specifically, the control unit 108 changes the color attributes of the texture of the synthesized face mask in accordance with a degree of difference in luminance or in color attributes between the texture of the face mask that serves as src and the texture of the face mask that serves as dst. For example, the control unit 108 changes the synthesized face mask from a synthesized face mask 36K1 as shown in the right diagram in FIG. 18 to a synthesized face mask 36K2 as shown in the right diagram in FIG. 18 by causing brightness of the texture of the synthesized face mask to be lowered. In this manner, it is possible to suppress the feeling of strangeness.

The aforementioned processing of changing the face feature information of the synthesized face mask may be performed after the synthesis or during the synthesis.

According to the seventh modification example of the embodiment, the information processing apparatus 100-1 changes the face feature information of the synthesized face mask on the basis of the input information as described above. Therefore, since the synthesized face mask suitable for the input information is displayed, it is possible to improve visibility of the synthesized face mask from the user.

The information processing apparatus 100-1 changes the face feature information of the synthesized face mask between the face feature information of the face mask that serves as src and the face feature information of the face model that serves as dst. Therefore, since it becomes easy to finely set the face feature information of the synthesized face mask, it is possible to improve the convenience for the user. In a case in which the face feature information of the synthesized face mask is changed in real time in response to a user's input operation after the synthesis, in particular, the user can make adjustment while checking the change in the synthesized face mask, and it is thus possible to further improve the convenience.

The information processing apparatus 100-1 changes the mesh information of the synthesized face mask on the basis of attribute information of the face mask that serves as src or the face mask that serves as dst. Therefore, since the synthesized face mask is changed regardless of which of src and dst the face mask corresponds to, user's options are widened, and it is possible to address various user's needs. Also, since the mesh information of the synthesized face mask is changed, it is possible to change a face expression expressed by the synthesized face mask and to fit the synthesized face mask to the synthesis destination.

The information processing apparatus 100-1 changes the texture information of the synthesized face mask on the basis of the face image with which the synthesized face mask is related or the face mask as the target of synthesis. Therefore, since the texture information of the synthesized face mask is changed, it is possible to change a face color expressed by the synthesized face mask and to fit the synthesized face mask to the synthesis destination.

Eighth Modification Example

According to the eighth modification example of the embodiment, the information processing apparatus 100-1 may use face feature information of another face mask in a case in which the face feature information for generating the synthesized face mask is insufficient. Here, there is a case in which the number of detected feature points in the face image corresponding to the face mask decreases by a person who appears in a moving image or a through image shaking his or her head or by changing a camera work. In such a case, the amounts of mesh information and texture information of the face mask of src or dst decrease and there is a possibility that a synthesized face mask that gives a feeling of strangeness to the user is generated. Thus, the control unit 108 uses face feature information of a face mask in the past in order to complement the insufficient face feature information.

Specifically, if the face mask is generated or updated, the control unit 108 causes the face feature information to be stored. For example, the control unit 108 temporarily causes the storage unit 110 to store feature point information of the face mask until a predetermined time elapses after the generation or the updating of the face mask.

Then, the control unit 108 acquires the stored face feature information in the past and complement the insufficient face feature information in a case in which the face feature information is insufficient. In a case in which the number of detected feature points is equal to or less than a threshold value, for example, the control unit 108 uses stored feature points in the past to complement the insufficient feature points.

Another face mask that has the face feature information that is used for the complementation may be a face mask of src or dst as a counterpart of the synthesis. In a case in which the number of detected feature points in the face mask of src is equal to or less than the threshold value, for example, the control unit 108 complements the feature points of src by using feature points of the face mask of dst corresponding to feature points that have not been detected in the face mask of src.

The transparency of the synthesized face mask may be changed in accordance with the number of detected feature points. For example, the control unit 108 sets a higher transparency for the texture of the synthesized face mask as the number of detected feature points in the face mask that serves as src or dst is smaller. Here, the mesh information and the texture information decrease, and appearance of the synthesized face mask becomes rougher as the number of the detected feature points decreases. However, since the transparency of the synthesized face mask increases as the number of detected feature points decreases according to the configuration, the user does not clearly visually recognize the synthesized face mask, and it is possible to obscure the roughness of the synthesized face mask.

In a case in which no feature points are detected, the synthesized face mask may be deleted. In a case in which no feature points of the face mask that serves as src or dst are detected, for example, the control unit 108 causes the synthesized face mask to fade out by gradually increasing the transparency of the texture of the synthesized face mask.

The face mask of src or dst for which the feature points have been detected may be superimposed and displayed instead of the synthesized face mask rather than deleting the synthesized face mask. In such a case, synthesis processing is not performed.

According to the eighth modification example of the embodiment, the information processing apparatus 100-1 uses the face feature information of another face mask in a case in which the face feature information for generating the synthesized face mask is insufficient. Therefore, since the display of the synthesized face mask is continued even in a case in which a part of feature points are not detected, it is possible to suppress frequent switching between display and non-display of the synthesized face mask and to maintain the visibility from the user.

Another face mask includes a face mask that serves as src or a face mask that serves as dst, which is a counterpart of the synthesis, or a face mask in the past. Therefore, since the complementation is made with the feature points that have compatibility to the synthesized face mask, it is possible to cause the possibility that the feeling of strangeness is given to the user who observes the synthesized face mask to be reduced.

Ninth Modification Example

Figure 19:
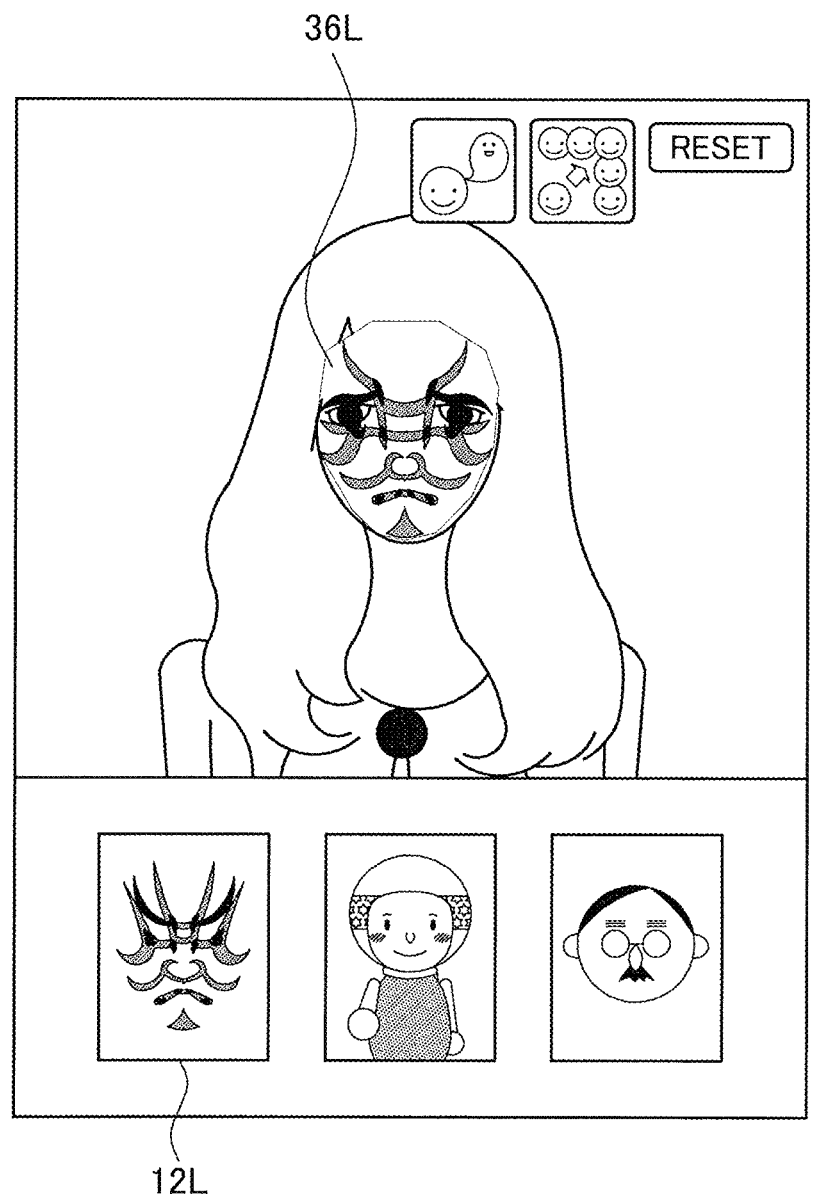
FIG. 19 is a diagram showing an example of processing of synthesizing an object other than a face according to a ninth modification example of the embodiment.
Figure 20:
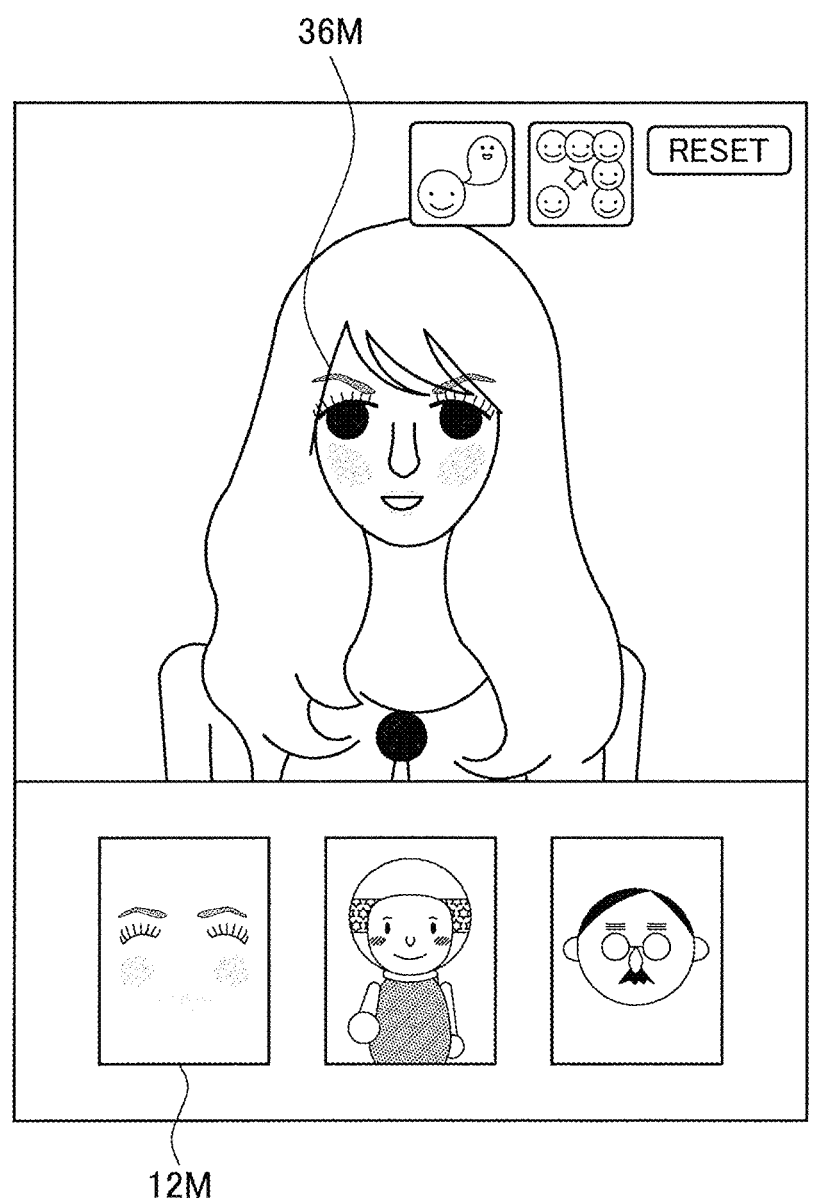
FIG. 20 is a diagram showing another example of processing of synthesizing an object other than a face according to the ninth modification example of the embodiment.

According to the ninth modification example of the embodiment, the information processing apparatus 100-1 may perform synthesis of an object other than a face. Specifically, the control unit 108 performs synthesis in which at least one of models of src and dst is an object model other than a face. For example, a face model is connected to an image of an object other than a face in advance. Then, the control unit 108 synthesizes the face model connected to the image of the object with a face model of a face image and causes the synthesized face model obtained by the synthesis to be superimposed and displayed on the image of the object or the face image. Furthermore, processing according to the modification example will be described in detail with reference to FIGS. 19 and 20. FIG. 19 is a diagram showing processing of synthesizing an object other than a face according to the ninth modification example of the embodiment, and FIG. 20 is a diagram showing another example of processing of synthesizing an object other than a face according to the ninth modification example of the embodiment.

An object other than a face includes an illustration. For example, a face model is connected to a kabuki illustration image 12L lined up in a face list as shown in FIG. 19 in advance. In a case in which the object is an object that is close to a face, a face model is generated through face recognition processing. If the illustration image 12L or the face model connected to the image 12L is moved to another face model or a face image, the control unit 108 performs synthesis of the face model connected to the image 12L with the face model or the face model generated from the face image at the movement destination. Then, the control unit 108 causes the synthesized face model 36L obtained by the synthesis as shown in FIG. 19 to be superimposed and displayed on the face image at the movement destination.

The object other than a face includes an image for superimposition. For example, a make-up image 12M lined up in a face list as shown in FIG. 20 is connected to a face model in advance. If the make-up image 12M or a face model connected to the make-up image 12M is moved to another face model or a face image, the control unit 108 performs synthesis of the face model connected to the make-up image 12M with the face model or the face model generated from the face image at the movement destination. Then, the control unit 108 causes the synthesized face model 36M obtained by the synthesis as shown in FIG. 20 to be superimposed and displayed on the face image at the movement destination.

Although the example in which the object other than a face is an illustration image or an image for superimposition has been described hitherto, the object may be a natural object such as a vegetable or an artificial object such as a clock.

Although the example in which a face model is connected to an object image in advance has been described hitherto, the information processing apparatus 100-1 may synthesize a model of an object that is generated from an object image. For example, the control unit 108 may synthesize a tomato model generated from a tomato image with another tomato model.

Furthermore, the control unit 108 may perform synthesis between models of different objects. For example, the control unit 108 performs synthesis of a face model generated from a face image with a tomato model generated from a tomato image. Since how to pick up the feature points and the numbers of the feature points are different between the face model and the tomato model in this case, mesh information and texture information are different. Therefore, the feature points, the mesh information, and the texture information are associated between the models in advance.

According to the ninth modification example of the embodiment, the information processing apparatus 100-1 performs synthesis in which at least one of models of src and dst is a model of an object other than a face as described above. Therefore, since application destinations of the synthesis processing are expanded to objects other than the face, it is possible to address various user's needs.

Tenth Modification Example

According to the tenth modification example of the embodiment, a synthesized face mask may be superimposed and displayed regardless of a user's operation. Specifically, if a predetermined time elapses after the face recognition, the control unit 108 performs synthesis of a face mask generated from a face image related to face recognition with a predetermined face mask and causes the synthesized face mask obtained by the synthesis to be superimposed and displayed on the face image.

The face mask to be synthesized may be moved toward the face image related to the recognized face. In a case in which a user's face is displayed on the screen, for example, and a predetermined time elapses after recognition of the user's face, a face mask or the like to be used for synthesis is moved toward the recognized user's face, that is, a face image on the screen as if the face mask or the like flew to the user's face. Then, if the moved face mask reaches the user's face, the synthesized face mask is superimposed and displayed on the user's face. In a case in which the moved face mask does not reach the user's face, the synthesis is not performed.

The face mask to be synthesized may be moved as if the face mask was carried by a display object displayed on the screen. For example, a character holds the face mask and moves, and if the character moves to the user's face, the synthesized face mask is superimposed and displayed on the user's face.

In a case in which the number of the face masks or the like that serve as dst is a predetermined number, synthesis of face masks corresponding to the predetermined number with the face masks that serve as dst may be performed. In a case in which seven faces are present on the screen, for example, face masks of a face mask group corresponding to seven, for example, face masks of faces of seven comic heroes and the face masks of the seven faces on the screen are respectively associated and synthesized with each other, and seven synthesized face masks obtained by the synthesis are respectively superimposed and displayed on the seven faces on the screen.

According to the tenth modification example of the embodiment, the synthesized face mask is superimposed and displayed regardless of a user's operation as described above. Therefore, the user does not need to perform the operation, and it is possible to omit time and efforts of the user. Also, the convenience for the user is improved in a case in which it is difficult for the user to perform the operation.

2. SECOND EMBODIMENT (APPLICATION EXAMPLE TO DIGITAL SIGNAGE APPARATUS)

The information processing apparatus 100-1 according to the first embodiment of the present disclosure has been described hitherto. Next, an information processing apparatus 100-2 according to a second embodiment of the present disclosure will be described. The information processing apparatus 100-2 according to the embodiment is a stationary apparatus such as a digital signage.

2-1. Configuration of Apparatus

Since a functional configuration of the information processing apparatus 100-2 according to the second embodiment of the present disclosure is substantially the same as the functional configuration of the information processing apparatus 100-1 according to the first embodiment, the description will be omitted.

2-2. Technical Features of Apparatus

Next, technical features of the information processing apparatus 100-2 according to the embodiment will be described. Descriptions of substantially the same features as those in the first embodiment will be omitted.

(G. Assignment of Target of Synthesis)

The information processing apparatus 100-1 assigns a target of synthesis in accordance with a user's gesture operation as an input based on user's motion.

(G-1. Assignment of Target of Synthesis Based on Movement of Face Mask)

Figure 21:
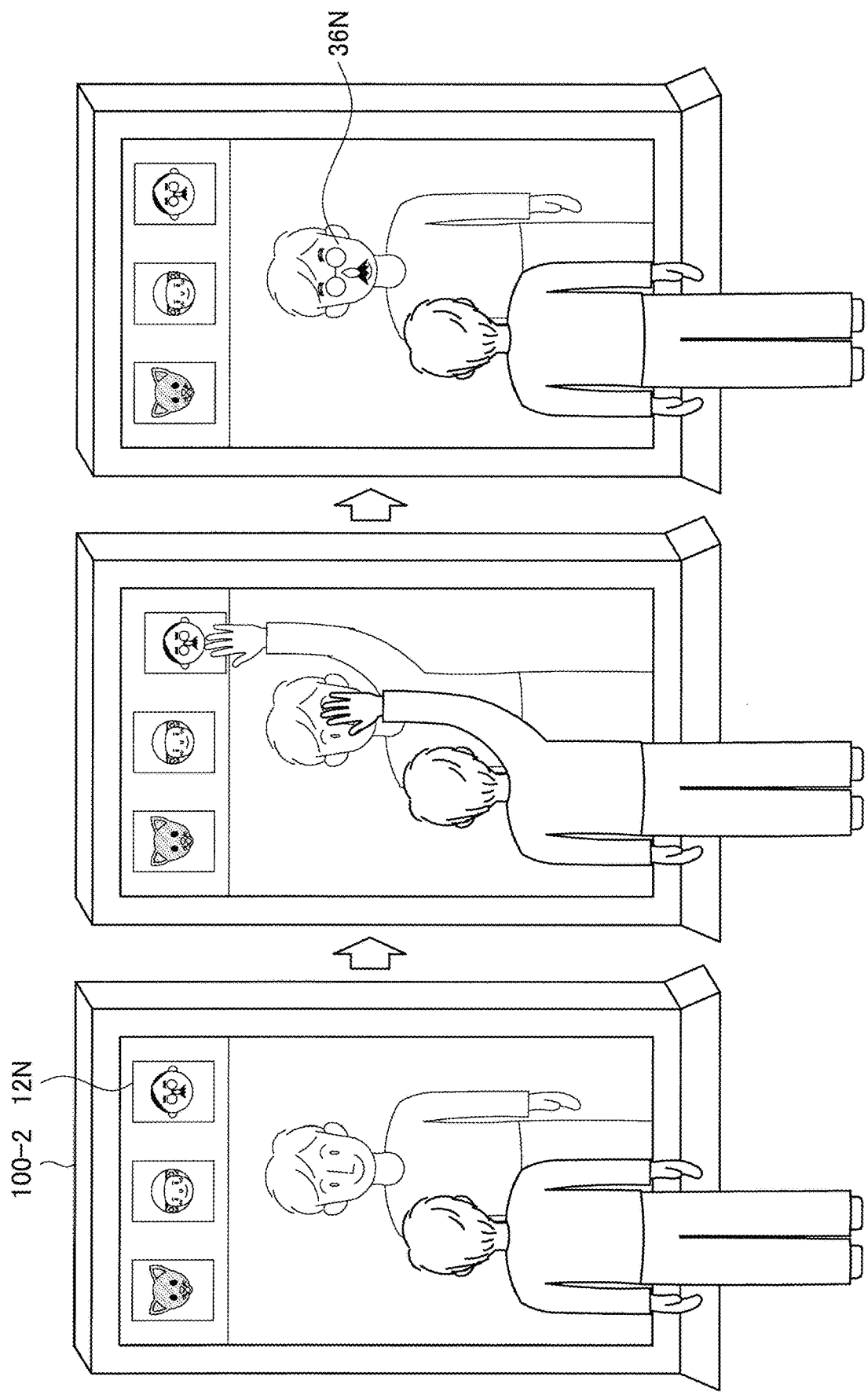
FIG. 21 is a diagram illustrating operations for moving a face mask as a target of synthesis, which are performed by an information processing apparatus according to a second embodiment of the present disclosure.

The control unit 108 causes a face mask of the target of synthesis to be moved in response to the user's gesture operation. Furthermore, processing of moving the face mask in response to the gesture operation will be described with reference to FIG. 21. FIG. 21 is a diagram illustrating an operation of moving a face mask of a target of synthesis in the information processing apparatus 100-2 according to the embodiment.

First, the control unit 108 causes a face mask or the like as a target of synthesis to be displayed. For example, the control unit 108 causes a face list in which face masks or the like that serve as src are lined up to be displayed as shown in the left diagram in FIG. 21.

Then, the control unit 108 causes a face mask or the like to be moved in response to a user's gesture of selecting the face mask or the like from the face list. If the user acts to pick up a face image 12N from the face list as shown in the center diagram in FIG. 21, for example, the control unit 108 causes the face image 12N to be moved in response to the user's action.

Next, if the face mask or the like is moved to the user's face, the control unit 108 causes a synthesized face mask to be superimposed and displayed on the user's face. If the face image 12N is moved to the user's face, for example, the control unit 108 causes a synthesized face mask 36N obtained by the synthesis of the face mask of the face image 12N and the face mask of the user's face to be superimposed and displayed on the user's face as shown in the right diagram in FIG. 21.

(G-2. Assignment of Target of Synthesis Based on User's Movement)

Figure 22:
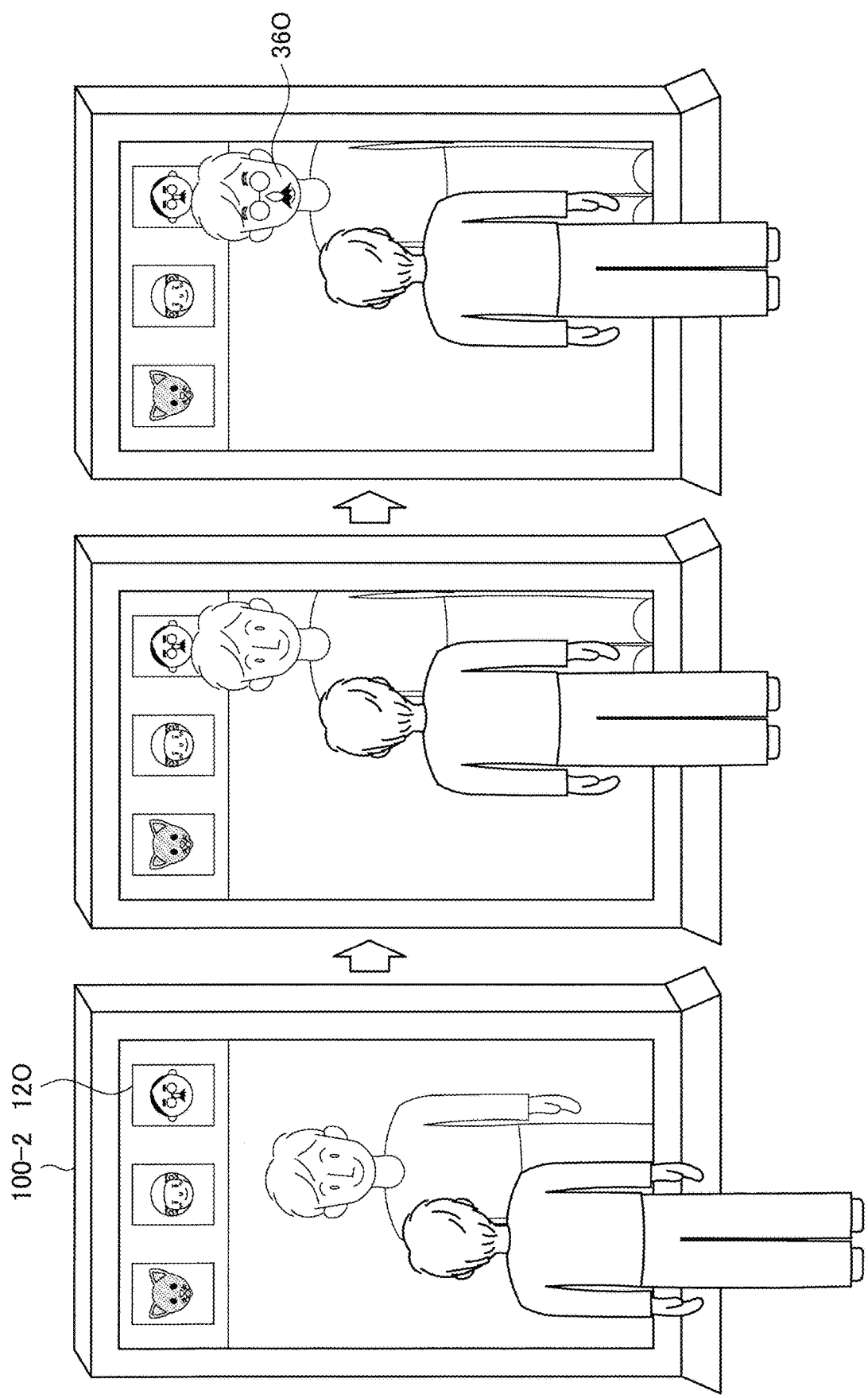
FIG. 22 is a diagram illustrating processing of assigning a target of synthesis based on movement of a user, which is performed by the information processing apparatus according to the embodiment.

Also, the control unit 108 may assign a target of synthesis on the basis of user's movement. Processing of this configuration will be described in detail with reference to FIG. 22. FIG. 22 is a diagram illustrating processing of assigning a target of synthesis on the basis of user's movement in the information processing apparatus 100-2 according to the embodiment. Description of substantially the same functions as the aforementioned functions will be omitted.

First, the control unit 108 causes a face mask as a target of synthesis to be displayed as described above.

If the user's face and the face mask are overlapped by the user's movement, then the control unit 108 causes the synthesized face mask to be superimposed and displayed on the user's face. If the user's face is overlapped with a face image 12 lined up in the face list as shown in the center diagram in FIG. 22, for example, the control unit 108 causes a synthesized face mask 36O obtained by the synthesis of a face mask of a face image 12O with a face mask of the user's face to be superimposed and displayed on the user's face as shown in the right diagram in FIG. 22.

2-3. Processing by Apparatus

Since processing by the information processing apparatus 100-2 according to the second embodiment of the present disclosure is substantially the same as the processing by the information processing apparatus 100-1 according to the first embodiment, description thereof will be omitted.

2-4. Summary of Second Embodiment

According to the second embodiment of the present disclosure, an input based on user's motion includes a gesture operation, and the information processing apparatus 100-2 causes a face mask to be moved, for synthesis, on the basis of the gesture operation as described above. Therefore, the user can sensually perform the operation for synthesis, and the operability in the operation related to the synthesis can be improved.

2-5. Modification Examples

The second embodiment of the present disclosure has been described hitherto. The embodiment is not limited to the aforementioned example. Hereinafter, first and second modification examples of the embodiment will be described.

First Modification Example

Figure 23:
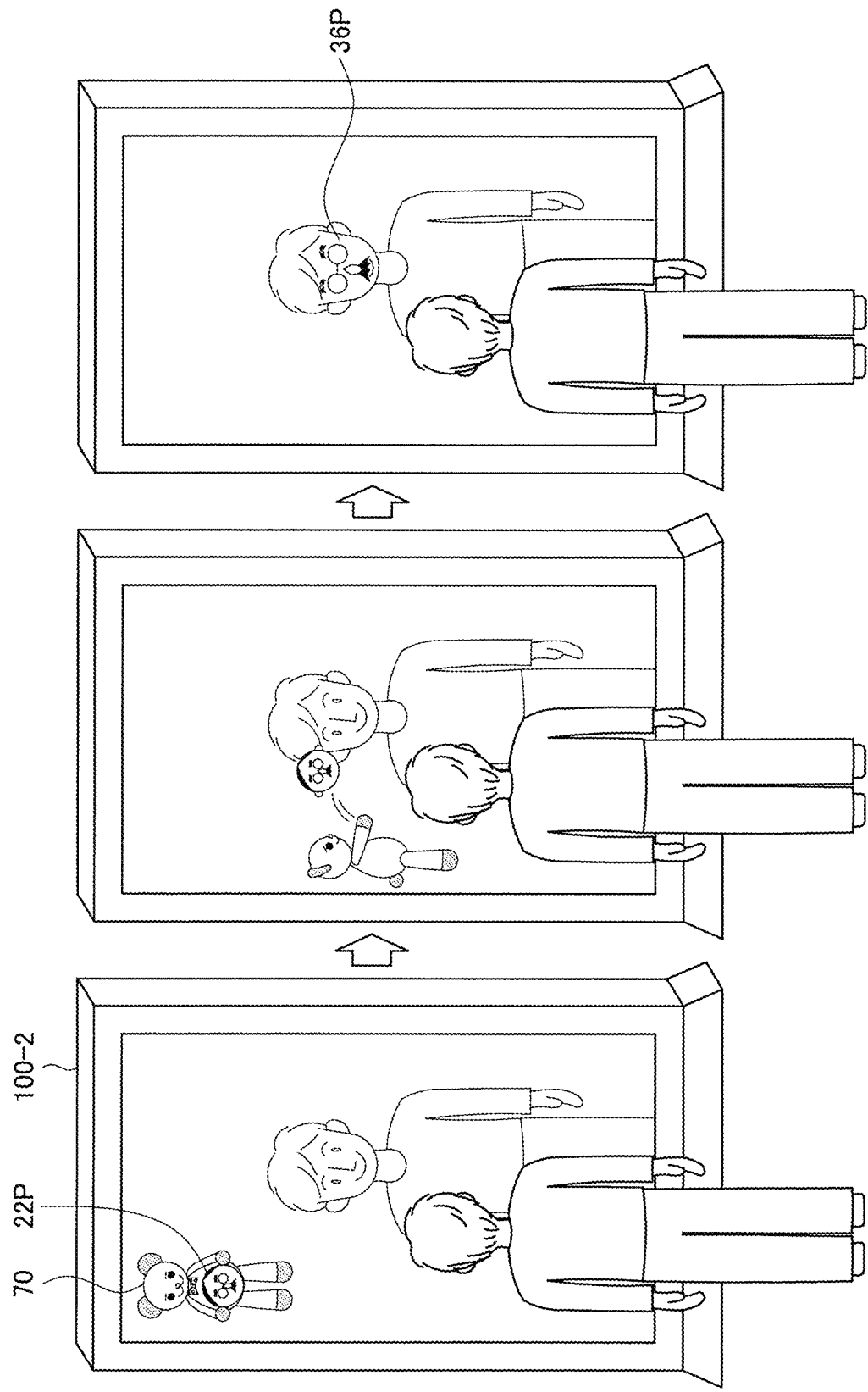
FIG. 23 is a diagram illustrating an example in which a face mask or the like that is a target of synthesis is moved by a character according to a first modification example of the embodiment.

According to the first modification example of the embodiment, a synthesized face mask may be superimposed and displayed regardless of a user's operation. Specifically, the control unit 108 causes a face mask of a target of synthesis to be moved as if the face mask was carried by a display object displayed on the screen. Furthermore, processing according to the modification example will be described in detail with reference to FIG. 23. FIG. 23 is a diagram illustrating an example in which a face mask or the like as a target of synthesis is moved by a character according to the first modification example of the embodiment.

The control unit 108 causes a display object that is accompanied by a face mask to be moved toward a user's face that appears on the screen. A character 70 that holds a face mask 22P moves toward the user's face on the screen as shown in the left diagram in FIG. 23, for example.

Next, if the display object that is accompanied by the face mask reaches the vicinity of the user's face that appears on the screen, the control unit 108 causes the face mask to be moved from the display object to the user's face. If the character 70 moves to the vicinity of the user's face, the character 70 through the face mask 22P that the character 70 holds toward the user's face as shown in the center diagram in FIG. 23, for example.

Next, if the face mask reaches the user's face that appears on the screen, the control unit 108 causes a synthesized face mask to be superimposed and displayed on the user's face. If the face mask 22P reaches the user's face as shown in the right diagram in FIG. 23, for example, a synthesized face mask 36P that is obtained by synthesis of the face mask 22P with the face mask of the user's face is superimposed and displayed on the user's face.

According to the first modification example of the embodiment, the information processing apparatus 100-2 causes the face mask of the target of synthesis to be moved as if the face mask was carried by the display object displayed on the screen. Therefore, it is possible to improve attraction of the user to the processing of synthesizing the face mask by allowing the user to enjoy the process before the synthesis is performed.

Second Modification Example

According to the second modification example of the embodiment, the information processing apparatus 100-2 may perform synthesis in accordance with a link of a target of synthesis. Specifically, the control unit 108 links the target of synthesis on the basis of a user's selection operation and performs synthesis on the basis of the linked target of synthesis. If the user selects a target of synthesis, for example, a face mask or the like that serves as dst, for example, and images his or her own face, for example, the control unit 108 generates a face mask of the user's face and links the selected face mask or the like with the face mask of the user. Then, the control unit 108 performs synthesis on the basis of the face mask or the like linked with the user's face mask and causes the generated synthesized face mask to be superimposed and displayed on the image in which the user's face appears.

One or both targets of synthesis may be selected on the face list. Also, a plurality of links may be provided, and in such a case, the user may select which of the links is to be used. For example, the user selects a link through a mobile terminal such as a smartphone or a tablet terminal, information about the selected link (hereinafter, also referred to as link information) is provided to the information processing apparatus 100-2 such as a digital signage, and the information processing apparatus 100-2 displays the synthesized face mask in accordance with the provided link information.

Figure 24:
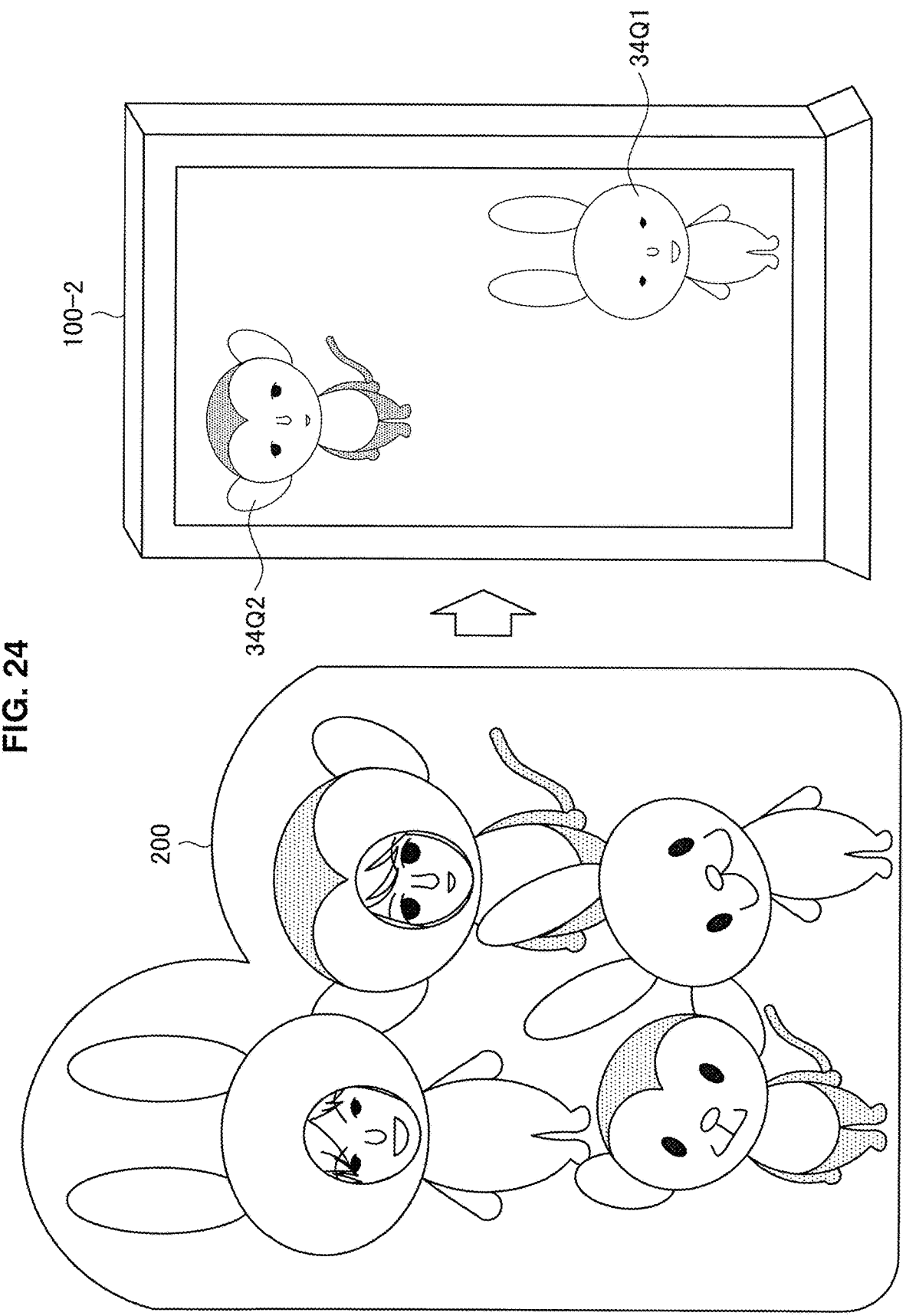
FIG. 24 is a diagram illustrating generation and sharing of link information according to a second modification example of the embodiment.

The link information of the target of synthesis may be shared with another apparatus. Specifically, the control unit 108 provides the link information to another information processing apparatus via communication. Furthermore, the sharing of the link information will be described in detail with reference to FIG. 24. FIG. 24 is a diagram illustrating generation and sharing of link information according to the second modification example of the embodiment.

The control unit 108 generates link information of a target of synthesis on the basis of a user's selection and shares the generated link information. For example, a face appearing position of a comic foreground 200 and a face mask of a character at the face appearing position are associated with each other in advance as shown in the left diagram in FIG. 24. The user selects a face that the user desires to cause to link, fit his or her face to the face appearing hole of a face that the user desires to cause to link, and images the comic foreground 200 in the state in which the face is fitted thereto. If an image obtained by the image capturing is provided to the information processing apparatus 100-2 via communication, then the control unit 108 generates a face mask of the user's face that is fitted thereto. Then, the control unit 108 generates link information of the generated face mask and the face mask associated with the face appearing position of the comic foreground 200. Then, the control unit 108 provides the link information to another information processing apparatus 100-2 via communication.

If the link information is provided, the control unit 108 stores the link information. If the link information is received, for example, the control unit 108 causes the storage unit 110 to store the link information.

Next, if the face corresponding to the face mask that matches the link information is recognized in the image obtained by the image capturing, the control unit 108 generates a face mask of the recognized face and superimposes and displays the synthesized face mask on the basis of the face mask and the linked face mask. If the user related to the stored link information enters an imaging range, and the user's face is recognized, for example, the control unit 108 generates the face mask of the user's face. Then, the control unit 108 causes synthesized face masks 34Q1 and 34Q2 obtained by the synthesis of the generated face mask and the linked face mask to be superimposed and displayed on character face images corresponding to the linked face masks, respectively.

Although the example in which the physical comic foreground 200 is used has been described hitherto, a virtual foreground to be displayed on the digital signage may be used.

The information processing apparatus that images the comic foreground may be the information processing apparatus 100-1 according to the first embodiment. In such a case, the information processing apparatus 100-1 that performs the image capturing generates the link information, and the information processing apparatus 100-1 provides the link information.

According to the second modification example of the embodiment, the information processing apparatus 100-2 links the target of synthesis on the basis of the user's selection operation and performs synthesis on the basis of the linked target of synthesis. Therefore, since the target of synthesis is managed by the linking, it becomes easy to store the combination of targets of synthesis and to recombine the targets of synthesis.

The link information is shared with another apparatus. Therefore, since the synthesized face mask is also displayed on another apparatus in accordance with the linking, it is possible to omit time and efforts required for setting the target of synthesis for each apparatus and to improve the convenience for the user.

3. APPLICATION EXAMPLES

The configurations described in the aforementioned respective embodiments can be applied to various cases. Hereinafter, a part of the cases other than the aforementioned respective embodiments will be described.
(Protection of Privacy)

It is possible to protect privacy by causing a synthesized face mask to be superimposed and displayed on a face of a person that appears in an image. For example, the information processing apparatus 100 generates the synthesized face mask on the basis of mesh information of dst and texture information of src by using the face mask of the person who appears in the image as dst and the separately selected face mask as src. Then, the information processing apparatus 100 causes the generated face mask to be superimposed and displayed on the face of the person who appears in the image that serves as dst.

The face mask that serves as src is superimposed and displayed on a face image corresponding to the face mask that serves as dst. In such a case, the face that appears in the image looks like a face covered with a facial mask.
(Movie of Karaoke)

It is possible to boost feeling of a person who sings a song with karaoke play or feeling of a person who listens to it by causing a synthesized face mask to be superimposed and displayed on a face of a person who appears in a movie displayed on karaoke. For example, the information processing apparatus 100 generates the synthesized face mask on the basis of mesh information of dst and texture information of src by using the face mask of the person who appears in the movie of the karaoke as dst and the face mask of the person who sings a song as src. Then, the information processing apparatus 100 causes the generated synthesized face mask to be superimposed and displayed on the face of the person who appears in the movie of the karaoke. The synthesized face mask may be generated on the basis of texture information of src and texture information of dst in an opposite manner.

Synthesis may be performed between faces of persons who appear in the karaoke movie. For example, the information processing apparatus 100 causes a synthesized face mask obtained by synthesis of a face mask of a face of a person X with a face mask of a face of another person Y who appears on the karaoke movie to be superimposed and displayed on the face of the person X who appears in the movie of the karaoke.
(Movie of Video Chatting)

By causing a synthesized face mask to be superimposed and displayed on a face of a person who appears in a movie of video chatting, it is possible to smoothen communication through the video chatting. For example, the information processing apparatus 100 causes a synthesized face mask obtained by synthesizing an eye part of a face mask of a person who appears in a movie of video chatting with eyes that look at a camera for the video chatting to be superimposed and displayed on the person. In this manner, the line of sight of the person who appears in the movie of the video chatting is displayed as if it was directed to the camera.
(Embedding of Face Feature Information in Medium)

It is possible to cause a synthesized face mask to be superimposed and displayed on a face that appears in an image even in a case in which it is difficult to directly generate a face mask from the image related to a medium, by connecting face feature information to the medium in advance. For example, the medium is a moving image, and face feature information or feature point information connected to each frame of the moving image is stored in moving image information as meta-information. Then, the information processing apparatus 100 performs synthesis by using face feature information or the like that is stored as moving image information of the moving image when the moving image is reproduced. The face feature information or the like may be connected to a part of frames of the moving image. The information stored as the moving image information may be feature point information and color information related to feature points.

The medium may be paper such as a magazine, a book, or a newspaper. For example, readable face feature information such as a two-dimensional AR marker is written in advance near a person who is posted in a magazine. If the user images the two-dimensional AR marker, then the information processing apparatus 100 generates a face mask on the basis of the face feature information read from the two-dimensional AR marker and performs synthesis by using the generated face mask.

4. HARDWARE CONFIGURATION OF INFORMATION PROCESSING APPARATUS ACCORDING TO ONE EMBODIMENT OF PRESENT DISCLOSURE

Figure 25:
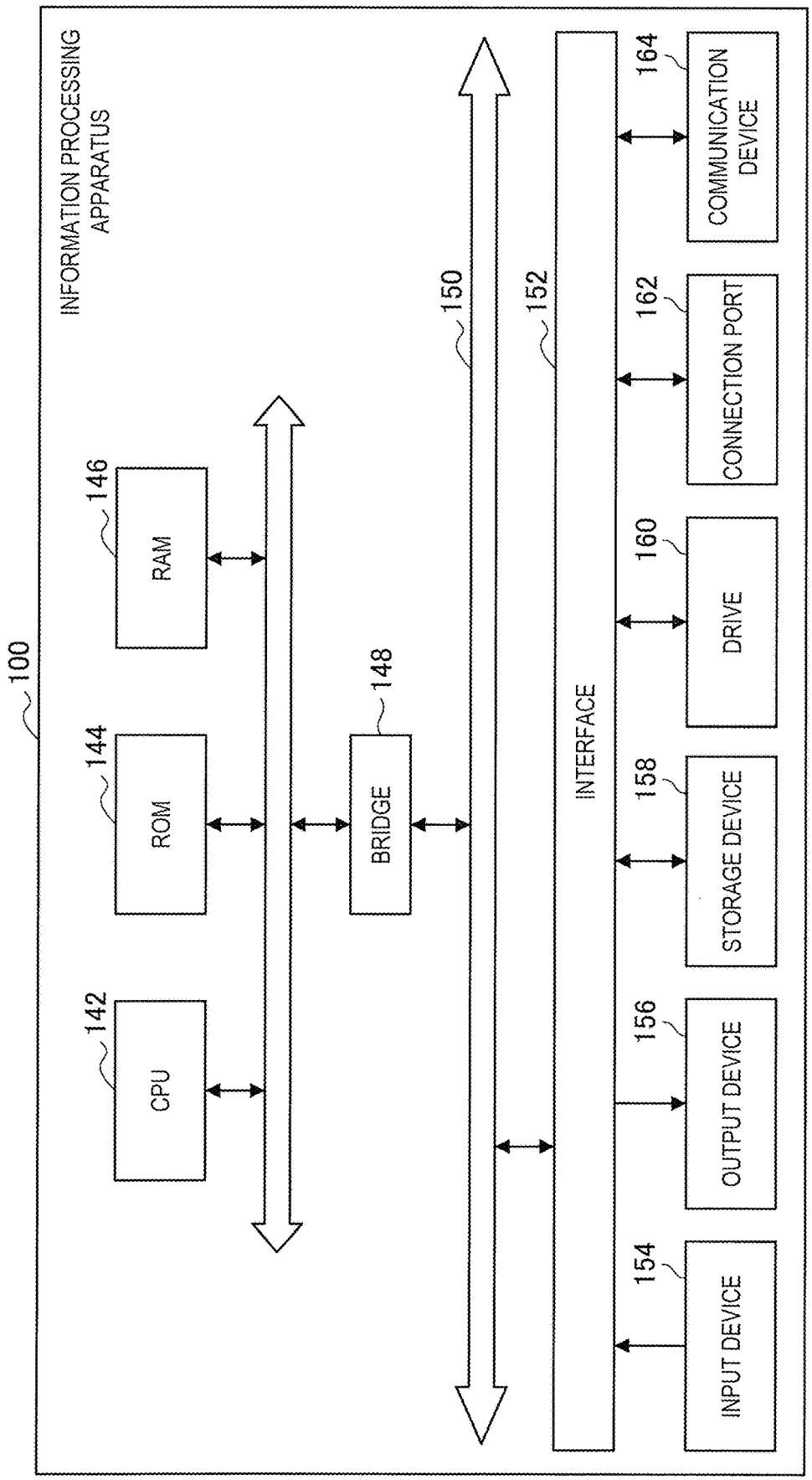
FIG. 25 is an explanatory diagram showing a hardware configuration of an information processing apparatus according to an embodiment of the present disclosure.

FIG. 25 is an explanatory diagram that illustrates a hardware configuration of the information processing apparatus 100 according to an embodiment of the present disclosure. As illustrated in FIG. 25, the information processing apparatus 100 includes a central processing unit (CPU) 142, a read only memory (ROM) 144, a random access memory (RAM) 146, a bridge 148, a bus 150, an interface 152, an input device 154, an output device 156, a storage device 158, a drive 160, a connection port 162, and a communication device 164.

The CPU 142 functions as a computation processing device, and cooperates with various types of programs to achieve the operation of the face recognition unit 104, the operation detection unit 106, and the control unit 108 in the information processing apparatus 100. Also, the CPU 142 may be a microprocessor. The ROM 144 stores programs, calculation parameters, or the like, used by the CPU 142. The RAM 146 temporarily stores the programs used in the execution of the CPU 142 or the parameters that change as appropriate in the execution, for example. The ROM 144 and the RAM 146 constitute a part of the storage unit 110 in the information processing apparatus 100. The CPU 142, the ROM 144, and the RAM 146 are connected to each other via an internal bus configured with a CPU bus or the like.

For example, as examples of the imaging unit 102 in the information processing apparatus 100, the input device 154 is configured with an input means for the user to input information, such as a mouse, a keyboard, a touch panel, a button, a microphone, a switch, and a lever, and an input control circuit that generates an input signal on the basis of an input by a user and outputs the input signal to the CPU 142, for example. The user of the information processing apparatus 100 can input various types of data to the information processing apparatus 100 and instruct the processing operation, by operating the input device 154.

For example, as an example of the display unit 112 in the information processing apparatus 100, the output device 156 performs outputting to a device such as a liquid crystal display (LCD) device, an organic light emitting diode (OLED) device, and a lamp, for example. Further, the output device 156 may perform sound outputting of a speaker, a headphone, and the like.

The storage device 158 is a device for data storage. The storage device 158 may include a storage medium, a record device that records data in the storage medium, a reading device that reads out data from the storage medium, a deleting device that deletes the data recorded in the storage medium, and the like. The storage device 158 stores the programs executed by the CPU 142 and various types of data.

The drive 160 is a reader/writer for the storage medium, and is provided inside or externally attached to the information processing apparatus 100. The drive 160 reads out the information recorded in a removable storage medium, such as a magnetic disk, an optical disc, a magneto-optical disk, or a semiconductor memory, which is put in the drive 160, and outputs the information to the RAM 134. Also, the drive 160 can write information into the removable storage medium.

The connection port 162 is a bus for connecting to an information processing apparatus or a peripheral device outside the information processing apparatus 100, for example. Also, the connection port 162 may be a universal serial bus (USB).

The communication device 164 is a communication interface configured with a communication device for connecting to a network, for example. Also, the communication device 164 may be an infrared communication compliant device, may be a wireless local area network (LAN) compatible communication device, may be a long term evolution (LTE) compatible communication device, or may be a wired communication device that performs wired communication.

5. CONCLUSION

According to the first embodiment of the present disclosure, it is possible to perform synthesis that is desirable for the user by performing the synthesis in accordance with input information as described above. It is possible to improve the operational feeling for the synthesis by moving the face mask in accordance with intentions of the user.

According to the second embodiment of the present disclosure, the user can sensually perform operations for synthesis, and operability of the operations related to the synthesis can be improved.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although face masks or the like as targets of synthesis are displayed on the same screen in the aforementioned embodiments, the present technology is not limited to such an example. For example, the face masks or the like as the targets of synthesis may be respectively displayed on different screens. For example, a user selects a face mask or the like that serves as src by a mobile terminal such as a smartphone, and causes the selected face mask or the like to be moved toward a device such as a digital signage on which a face mask or the like that serves as dst is displayed, by a swiping operation, for example. As a result, the face mask that serves as src is provided from the smartphone to the digital signage via communication, and the synthesized face mask obtained by synthesis using the provided face mask is superimposed and displayed on the face of dst displayed by the digital signage.

Although the example in which synthesis is performed on the entire face has been described in the aforementioned embodiments, the synthesis may be performed on a part of the face. For example, the synthesis is performed only on a part of the face, such as eyes, a nose, a mouth, or eyebrows.

Although the example in which the display unit 112 is a display has been described in the aforementioned embodiments, the display unit 112 may be a projector. For example, the control unit 108 causes a synthesized face mask to be projected to the display unit 112 toward the face corresponding to the face mask that serves as dst.

Although the example in which the main target of synthesis if a face mask has been described in the aforementioned embodiments, the target of synthesis may be a mask of a head. For example, the information processing apparatus 100 may generate a model for the entire head, that is, a head mask and performs synthesis of the generated head mask.

Although the example in which the information processing apparatus 100 is a smartphone, a tablet terminal, or a digital signage has been described in the aforementioned embodiments, the information processing apparatus 100 may be a head mount display (HMD) of a so-called optical see-through type or a video see-through type or a personal computer (PC).

The information processing apparatus 100 may cause the synthesized face mask to be changed on the basis of position information of a person related to the face mask or the like that serves as src. Specifically, the information processing apparatus 100 causes the synthesized face mask to be changed in accordance with a distance between the position indicated by the position information and a specific position. For example, the information processing apparatus 100 causes face feature information of a synthesized face mask, which is obtained by synthesizing a face mask of a face of a user with a face mask of a face of an artist in a live concert, to further approach face feature information of the face mask of the artist as the user approaches the music live concert hall. In a case in which the information processing apparatus 100 is a HMD, the synthesized face mask is superimposed and displayed on persons around the user. It is a matter of course that the synthesized face mask may be superimposed and displayed on the face of the artist. In such a case, it is possible to provide a fan to the user even in a process of visiting to a specific position such as a live concert hall.

The information processing apparatus 100 may cause the synthesized face mask to be changed in accordance with whether the position indicated by the position information is within a specific range. For example, in a case in which the user is in a theme park, the information processing apparatus 100 causes a synthesized face mask obtained by synthesizing face masks of other persons in the theme park and a face mask of a face of the user on the faces of the other persons to be superimposed and displayed. If the user leaves the theme park, the information processing apparatus 100 stops the superimposition and display of the synthesized face mask. In such a case, it is possible to improve a realistic sensation in the specific region such as a theme park.

Although some application examples have been described hitherto, it is a matter of course that the configurations of the respective embodiments of the present disclosure may be applied to other fields, business categories, products, applications, or the like. For example, the configurations may be applied to the field of cosmetic surgery. In such a case, a face after surgery is superimposed as a synthesized face mask on a user's face, for example.

Further, the effects described in this specification are merely illustrative or exemplified effects, and are not limitative. That is, with or in the place of the above effects, the technology according to the present disclosure may achieve other effects that are clear to those skilled in the art from the description of this specification.

Further, not only a process in which steps shown in the flowcharts of the above embodiments are performed in a time-series manner in accordance with a described sequence but also a process in which the steps are not necessarily processed in a time-series manner but are executed in parallel or individually is included. Also, it is self-evident that even steps processed in a time-series manner can be appropriately changed in sequence depending on circumstances.

Additionally, the present technology may also be configured as below.

(1)

An information processing apparatus including:

a control unit configured to generate a synthesized object model by synthesizing a first object model and a second object model, and cause the generated synthesized object model to be displayed in association with an image corresponding to the first object model or the second object model, in which the control unit controls a mode of the synthesis on the basis of input information.

(2)

The information processing apparatus according to (1), in which the first object model includes a first face model, the second object model includes a second face model, and the synthesized object model includes a synthesized face model.

(3)

The information processing apparatus according to (2), in which the mode includes a first mode in which the synthesized face model is generated on the basis of mesh information of the first face model, and a second mode in which the synthesized face model is generated on the basis of mesh information of the second face model.

(4)

The information processing apparatus according to (3), in which, in the first mode, the synthesized face model is generated on the basis of texture information of the second face model, and in the second mode, the synthesized face model is generated on the basis of texture information of the first face model.

(5)

The information processing apparatus according to any one of (2) to (4), in which face feature information includes mesh information and texture information of a face model, and the mode includes a third mode in which the synthesized face model is generated on the basis of the mesh information of the first face model, the mesh information of the second face model, the texture information of the first face model, and the texture information of the second face model.

(6)

The information processing apparatus according to any one of (2) to (5), in which the control unit causes the synthesized face model to be displayed in association with an image specified on the basis of a user's input from among images corresponding to the first face model and the second face model.

(7)

The information processing apparatus according to any one of (2) to (6), in which the input information includes information related to an image corresponding to the first face model or the second face model that serves as an input of processing performed by the control unit.

(8)

The information processing apparatus according to (7), in which the information related to the image includes information related to an attribute of the image or content of the image.

(9)

The information processing apparatus according to any one of (2) to (8), in which the input information includes information related to a user's input operation.

(10)

The information processing apparatus according to (9), in which the user's input operation includes an operation of selecting the first face model or the second face model, and the control unit assigns the mode in accordance with a selected position of the first face model or the second face model.

(11)

The information processing apparatus according to (10), in which the control unit causes the selected position of the first face model or the second face model corresponding to each of the modes to be displayed in a visually distinguishable form.

(12)

The information processing apparatus according to any one of (2) to (11), in which the control unit uses face feature information of another face model in a case in which face feature information for generating the synthesized face model is insufficient.

(13)

The information processing apparatus according to (12), in which the other face model includes a past face model, or the first face model or the second face model serving as a counterpart of the synthesis.

(14)

The information processing apparatus according to any one of (2) to (13), in which the control unit changes the face feature information of the synthesized face model on the basis of the input information.

(15)

The information processing apparatus according to (14), in which the control unit changes face feature information of the synthesized face model between face feature information of the first face model and face feature information of the second face model on the basis of a user's input operation.

(16)

The information processing apparatus according to (14) or (15), in which the control unit changes mesh information of the synthesized face model on the basis of attribute information of the first face model or the second face model.

(17)

The information processing apparatus according to any one of (14) to (16), in which the control unit changes texture information of the synthesized face model on the basis of the first face model, the second face model, or an image with which the synthesized face model is associated.

(18)

The information processing apparatus according to any one of (2) to (17), in which at least one of images corresponding to the first face model and the second face model includes an image that is temporarily recorded by imaging.

(19)

An information processing method including: by a control unit, generating a synthesized object model by synthesizing a first object model and a second object model;

causing the generated synthesized object model to be displayed in association with an image corresponding to the first object model or the second object model; and controlling a mode of the synthesis on the basis of input information.

(20)

A program that causes a computer to realize:

a function of generating a synthesized object model by synthesizing a first object model and a second object model;

a function of causing the generated synthesized object model to be displayed in association with an image corresponding to the first object model or the second object model; and a function of controlling a mode of the synthesis on the basis of input information.

Additionally, the present technology may also be configured as below.

(1)

An information processing apparatus including:

a control unit configured to generate a synthesized object model by synthesizing a first object model and a second object model, and cause the generated synthesized object model to be displayed in association with an image corresponding to the first object model or the second object model, in which the control unit causes the first object model or the second object model to be moved, for the synthesis, in response to an input based on a user's motion with respect to a screen on which an object model or an image corresponding to the object model is displayed.

(2)

The information processing apparatus according to (1), in which the first object model includes a first face model, the second object model includes a second face model, and the synthesized object model includes a synthesized face model.

(3)

The information processing apparatus according to (2), in which, after movement from one of the first face model and the second face model to the other is completed, the control unit causes the synthesized face model to be displayed in association with the image corresponding to the other face model.

(4)

The information processing apparatus according to (2) or (3), in which, when the input based on the user's motion is interrupted, the control unit does not perform the synthesis.

(5)

The information processing apparatus according to any one of (2) to (4), in which the input based on the user's motion includes an operation of assigning both a start point and an end point or an operation of assigning only the start point.

(6)

The information processing apparatus according to any one of (2) to (5), in which the input based on the user's motion includes a gesture operation.

(7)

The information processing apparatus according to any one of (2) to (6), in which the control unit causes the first face model or the second face model corresponding to the image associated with the synthesized face model to be displayed to be adjacent to the synthesized face model when the synthesized face model is displayed.

(8)

The information processing apparatus according to any one of (2) to (7), in which the first face model or the second face model to be moved includes a face model that is lined up in a face list displayed on the screen or a face model that is generated from an image lined up in the face list.

(9)

The information processing apparatus according to (8), in which the control unit selects a face model or an image lined up in the face list on the basis of an attribute of a face that is expressed by the first face model or the second face model.

(10)

The information processing apparatus according to (8) or (9), in which the control unit adds the first face model or the second face model moved toward the face list to the face list.

(11)

The information processing apparatus according to any one of (8) to (10), in which the control unit performs prior display of a second synthesized face model related to the synthesized face model.

(12)

The information processing apparatus according to (11), in which the prior display of the second synthesized face model includes causing the first face model or the second face model, which is being moved, to be changed into the second synthesized face model.

(13)

The information processing apparatus according to (12), in which the second synthesized face model includes a synthesized face mask in which face feature information of the synthesized face model is changed in accordance with information related to the movement of the first face model or the second face model, which is being moved.

(14)

The information processing apparatus according to any one of (11) to (13), in which the prior display of the second synthesized face model includes causing a face model that is lined up in the face list or a face model that is generated from an image lined up in the face list, to be changed into the second synthesized face model.

(15)

The information processing apparatus according to (14), in which the control unit causes a face model selected from or all the face models from among face models lined up in the face list or face models that are generated from images lined up in the face list, to be changed into the second synthesized face model.

(16)

The information processing apparatus according to any one of (2) to (15), in which, in a case in which a plurality of face models or images corresponding to the face models are displayed on the screen, the control unit generates the respective synthesized face models on the basis of a moved face model and the plurality of face models or the images corresponding to the face models.

(17)

The information processing apparatus according to (16), in which, when a face model is moved to one of the plurality of face models or one of the images corresponding to the face models, the control unit performs the synthesis.

(18)

The information processing apparatus according to any one of (2) to (17), in which at least one of the first face model and the second face model includes a face model of the user.

(19)

An information processing method including: by a control unit, generating a synthesized object model by synthesizing a first object model and a second object model;

causing the generated synthesized object model to be displayed in association with an image corresponding to the first object model or the second object model; and causing the first object model or the second object model to be moved, for the synthesis, in response to an input based on a user's motion with respect to a screen on which an object model or an image corresponding to the object model is displayed.

(20)

A program that causes a computer to realize:

a function of generating a synthesized object model by synthesizing a first object model and a second object model;

a function of causing the generated synthesized object model to be displayed in association with an image corresponding to the first object model or the second object model; and a function of causing the first object model or the second object model to be moved, for the synthesis, in response to an input based on a user's motion with respect to a screen on which an object model or an image corresponding to the object model is displayed.

REFERENCE SIGNS LIST 100 information processing apparatus
102 imaging unit
104 face recognition unit
106 operation detection unit
108 control unit
110 storage unit
112 display unit

The invention claimed is:

1. An information processing apparatus comprising:
a control unit configured to
cause a face list, which includes a plurality of object models, to be displayed,
select a first object model of the plurality of the object models based on a user's input operation on the face list,
generate a synthesized object model by synthesizing the first object model and a second object model, and
cause the generated synthesized object model to be displayed in association with an image corresponding to the first object model or the second object model, wherein
the control unit controls a mode of the synthesis on a basis of input information, and
the control unit is implemented via at least one processor.

2. The information processing apparatus according to claim 1,
wherein the first object model includes a first face model,
the second object model includes a second face model, and
the synthesized object model includes a synthesized face model.

3. The information processing apparatus according to claim 2,
wherein the mode includes a first mode in which the synthesized face model is generated on a basis of mesh information of the first face model, and a second mode in which the synthesized face model is generated on a basis of mesh information of the second face model.

4. The information processing apparatus according to claim 3,
wherein, in the first mode, the synthesized face model is generated on a basis of texture information of the second face model, and
in the second mode, the synthesized face model is generated on a basis of texture information of the first face model.

5. The information processing apparatus according to claim 2,
wherein face feature information includes mesh information and texture information of a face model, and
the mode includes a third mode in which the synthesized face model is generated on a basis of the mesh information of the first face model, the mesh information of the second face model, the texture information of the first face model, and the texture information of the second face model.

6. The information processing apparatus according to claim 2,
wherein the control unit is further configured to cause the synthesized face model to be displayed in association with an image specified on a basis of a user's input from among images corresponding to the first face model and the second face model.

7. The information processing apparatus according to claim 2,
wherein the input information includes information related to an image corresponding to the first face model or the second face model that serves as an input of processing performed by the control unit.

8. The information processing apparatus according to claim 7,
wherein the information related to the image includes information related to an attribute of the image or content of the image.

9. The information processing apparatus according to claim 2,
wherein the input information includes information related to the user's input operation.

10. The information processing apparatus according to claim 9,
wherein the user's input operation includes an operation of selecting the first face model or the second face model, and
the control unit assigns the mode in accordance with a selected position of the first face model or the second face model.

11. The information processing apparatus according to claim 10,
wherein the control unit is further configured to cause the selected position of the first face model or the second face model corresponding to each of the modes to be displayed in a visually distinguishable form.

12. The information processing apparatus according to claim 2,
wherein the control unit is further configured to use face feature information of another face model in a case in which face feature information for generating the synthesized face model is insufficient.

13. The information processing apparatus according to claim 12,
wherein the another face model includes a past face model, or the first face model or the second face model serving as a counterpart of the synthesis.

14. The information processing apparatus according to claim 2,
wherein the control unit is further configured to change face feature information of the synthesized face model on the basis of the input information.

15. The information processing apparatus according to claim 14,
wherein the control unit is further configured to change the face feature information of the synthesized face model between face feature information of the first face model and face feature information of the second face model on a basis of the user's input operation.

16. The information processing apparatus according to claim 14,
wherein the control unit is further configured to change mesh information of the synthesized face model on a basis of attribute information of the first face model or the second face model.

17. The information processing apparatus according to claim 14,
wherein the control unit is further configured to change texture information of the synthesized face model on a basis of the first face model, the second face model, or an image with which the synthesized face model is associated.

18. The information processing apparatus according to claim 2,
wherein at least one of images corresponding to the first face model and the second face model includes an image that is temporarily recorded by imaging.

19. An information processing method comprising: by a control unit,
causing a face list, which includes a plurality of object models, to be displayed;
selecting a first object model of the plurality of the object models based on an input by a user on the face list;
generating a synthesized object model by synthesizing the first object model and a second object model;
causing the generated synthesized object model to be displayed in association with an image corresponding to the first object model or the second object model; and
controlling a mode of the synthesis on a basis of input information.

20. A non-transitory computer-readable medium having embodied thereon a program, which when executed by a computer causes the computer to execute an information processing method, the method comprising:
causing a face list, which includes a plurality of object models, to be displayed;
selecting a first object model of the plurality of the object models based on an input by a user on the face list;
of generating a synthesized object model by synthesizing the first object model and a second object model;
causing the generated synthesized object model to be displayed in association with an image corresponding to the first object model or the second object model; and
controlling a mode of the synthesis on a basis of input information.

* * * * *